United States Patent
Yang et al.

(10) Patent No.: US 12,513,655 B2
(45) Date of Patent: Dec. 30, 2025

(54) MEC-BASED POSITIONING METHOD, DEVICE, AND WIRELESS COMMUNICATION SYSTEM

(71) Applicant: HUAWEI TECHNOLOGIES CO., LTD., Shenzhen (CN)

(72) Inventors: Mingyue Yang, Shanghai (CN); Runze Zhou, Shanghai (CN); Fangyuan Zhu, Beijing (CN); Jingwang Ma, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 495 days.

(21) Appl. No.: 17/973,735

(22) Filed: Oct. 26, 2022

(65) Prior Publication Data
US 2023/0040349 A1 Feb. 9, 2023

Related U.S. Application Data

(63) Continuation of application No. PCT/CN2020/087334, filed on Apr. 27, 2020.

(51) Int. Cl.
*H04W 64/00* (2009.01)
(52) U.S. Cl.
CPC .................. *H04W 64/003* (2013.01)
(58) Field of Classification Search
CPC .................................................. H04W 64/003
See application file for complete search history.

(56) References Cited

U.S. PATENT DOCUMENTS

2020/0053638 A1* 2/2020 Edge .................. H04W 64/003
2022/0007150 A1  1/2022 Edge et al.

FOREIGN PATENT DOCUMENTS

| CN | 1968507 A | 5/2007 |
|---|---|---|
| CN | 102843767 A | 12/2012 |

(Continued)

OTHER PUBLICATIONS

Chinese Office Action issued in corresponding Chinese Application No. 202080100134.4, dated Dec. 21, 2024, pp. 1-11.

(Continued)

*Primary Examiner* — Justin Y Lee
(74) *Attorney, Agent, or Firm* — HAUPTMAN HAM, LLP

(57) ABSTRACT

This application provide a MEC-based positioning method, a device, and a wireless communication system. The method includes: A first network element receives first positioning request information for requesting to position a terminal, and the first positioning request information carries identification information of the terminal. The first network element determines, based on the first positioning request information, a positioning functional entity for positioning the terminal, where the positioning functional entity is a positioning server. The first network element obtains second positioning request information based on the first positioning request information, and sends the second positioning request information to the positioning server. After receiving the second positioning request information, the positioning server sends measurement request information to the terminal via a user plane, to request the terminal to report measurement data. Then, the positioning server positions the terminal based on the measurement data reported by the terminal via the user plane.

20 Claims, 13 Drawing Sheets

(56) References Cited

FOREIGN PATENT DOCUMENTS

| | | | |
|---|---|---|---|
| CN | 107205269 | A | 9/2017 |
| CN | 110291798 | A | 9/2019 |
| CN | 110999435 | A | 4/2020 |
| CN | 111052849 | A | 4/2020 |
| WO | 2018093380 | A1 | 5/2018 |

OTHER PUBLICATIONS

Extended European Search Report issued in corresponding European Application No. 20933381.4, dated Apr. 28, 2023, pp. 1-7.
ETSI GS MEC 013 V2.1.1 (Sep. 2019), Multi-access Edge Computing (MEC); Location API. 39 pages.
3GPP TS 23.501 V16.4.0 (Mar. 2020), 3rd Generation Partnership Project; Technical Specification Group Services and System Aspects; System architecture for the 5G System (5GS); Stage 2(Release 16), 430 pages.
International Search Report issued in corresponding International Application No. PCT/CN2020/087334, dated Jan. 11, 2021, pp. 1-10.
Chinese Office Action issued in corresponding Chinese Application No. 202080100134.4, dated Sep. 6, 2024, pp. 1-12.

* cited by examiner

MEC-BASED POSITIONING METHOD, DEVICE, AND WIRELESS COMMUNICATION SYSTEM

CROSS-REFERENCE TO RELATED APPLICATIONS

This application a continuation of International Application No. PCT/CN2020/087334, filed on Apr. 27, 2020, the disclosure of which is hereby incorporated by reference in its entirety.

TECHNICAL FIELD

This application relates to the field of mobile communication network technologies, and in particular, to a mobile edge computing (mobile edge computing, MEC)-based positioning method, a device, and a wireless communication system.

BACKGROUND

Currently, both 5G and 4G evolved packet core networks (evolved packet core networks, EPCs) support a positioning exposure service for a specific terminal (user equipment, UE). To be specific, a core network may provide an external client (external client) or an application function (application function, AF) with a positioning service for the specific terminal via a network exposure function (network exposure function, NEF) network element, a service capability exposure function (service capability exposure function, SCEF) network element, and a gateway mobile location center (gateway mobile location center, GMLC) network element.

In an existing positioning procedure, when a terminal exchanges data, for example, exchanges measurement data (measurement data), with a selected location management function (location management function, LMF) network element, namely, a positioning functional entity, in a core network, both uplink data and downlink data are forwarded through a control plane channel. For example, in a process in which an LMF network element delivers measurement request information (which is used to request the terminal to report the measurement data) to the terminal and the terminal reports the measurement data to the LMF network element, both the measurement request information and the measurement data need to be forwarded by an access and mobility management function (access and mobility management function, AMF) network element. However, because the AMF network element is deployed at a high position in the core network (for example, a middle part of the core network), when data exchange between the terminal and the LMF network element is forwarded by the AMF network element, transmission duration corresponding to data transmission between the terminal and the LMF network element is long, which causes an increased positioning latency of the terminal.

SUMMARY

Embodiments of this application provide a MEC-based positioning method, a device, and a wireless communication system, to shorten a positioning latency of a terminal.

According to a first aspect, this application provides a mobile edge computing MEC-based positioning method. The method includes: A first network element receives first positioning request information sent by a positioning requester, where the first positioning request information is used to request to position a terminal, and the first positioning request information carries identification information of the terminal. The first network element determines, based on the first positioning request information, a positioning functional entity for positioning the terminal, where the positioning functional entity is a positioning server. The first network element obtains second positioning request information based on the first positioning request information, and sends the second positioning request information to the positioning server, to trigger the positioning server to position the terminal via a user plane.

By applying the foregoing design, in a process of positioning the terminal, the first network element may determine, based on the first positioning request information, that the positioning functional entity for positioning the terminal is the positioning server, to enable the positioning server to subsequently position the terminal via the user plane based on the second positioning request information sent by the first network element, and avoid a problem that a positioning latency is long, where the problem is caused by interaction performed through a control plane transmission path, that is, forwarding performed via the first network element. In this way, a positioning server that is close to the terminal and an access device may be selected to position the terminal. Therefore, a transmission distance between the terminal and the positioning server may be shortened, and transmission duration required for data transmission between the terminal and the positioning server may be reduced, so that the positioning latency of the terminal can be further shortened, thereby improving user experience.

In a possible design, the method further includes: The first network element determines, based on a positioning latency requirement or first indication information carried in the first positioning request information, that the positioning requester has a high requirement for latency.

By applying the foregoing design, the first network element may determine, based on the positioning latency requirement or the first indication information carried in the first positioning request information, a latency requirement for positioning the terminal, to satisfy a requirement of the positioning requester for quickly positioning the terminal.

In a possible design, that the first network element determines, based on the first positioning request information, a positioning server for positioning the terminal includes: The first network element obtains first location information of the terminal based on the identification information of the terminal, and obtains configuration information of at least one positioning server, where the configuration information of the at least one positioning server includes area information managed by the at least one positioning server; and the first network element determines, based on the first location information of the terminal and the configuration information of the at least one positioning server, the positioning server for positioning the terminal.

By applying the foregoing design, the first network element may determine, from the at least one positioning server based on the first location information of the terminal and the configuration information of the at least one positioning server, the positioning server for positioning the terminal, to ensure that the determined positioning server is close to the terminal and the access network device. In this way, the transmission distance between the terminal and the positioning server may be shortened, and the transmission duration required for data transmission between the terminal and the positioning server may be further reduced, so that the latency in positioning the terminal by the positioning server can be shortened.

In a possible design, the first location information of the terminal is target tracking area identity TAI information; and the area information managed by the at least one positioning server is tracking area identity TAI information managed by the at least one positioning server.

In a possible design, that the first network element obtains second positioning request information based on the first positioning request information includes: The first network element obtains, based on the identification information of the terminal, a network address of the terminal; and the first network element obtains the second positioning request information based on the first positioning request information and the network address of the terminal, where the second positioning request information includes the network address of the terminal.

By applying the foregoing design, the first network element may obtain, based on the identification information of the terminal, the network address of the terminal, to enable the positioning server to subsequently position the terminal via the user plane based on the network address of the terminal. In this way, the transmission distance between the terminal and the positioning server may be shortened, and the transmission duration required for data transmission between the terminal and the positioning server may be further reduced, so that the latency in positioning the terminal by the positioning server can be shortened.

In a possible design, that the first network element obtains, based on the identification information of the terminal, a network address of the terminal includes: The first network element sends the identification information of the terminal and information about the positioning server to a session management function SMF network element; and the first network element obtains the network address of the terminal sent by the SMF network element.

By applying the foregoing design, when a data connection corresponding to the terminal has been successfully established, the first network element may obtain the network address of the terminal via the SMF network element, to enable the positioning server to subsequently position the terminal via the user plane based on the network address of the terminal. In this way, the transmission distance between the terminal and the positioning server may be shortened, and the transmission duration required for data transmission between the terminal and the positioning server may be further reduced, so that the latency in positioning the terminal by the positioning server can be shortened.

In a possible design, that the first network element obtains, based on the identification information of the terminal, a network address of the terminal includes: The first network element sends information about the positioning server to the terminal, to trigger the terminal to establish a data connection between the terminal and the positioning server; and the first network element obtains the network address of the terminal sent by an SMF network element, where the network address is allocated by a network to the terminal in a data connection establishment process.

By applying the foregoing design, when the data connection corresponding to the terminal is not established, the first network element may obtain, by triggering the terminal to establish the data connection between the terminal and the positioning server, the network address that is allocated by the network to the terminal in the data connection establishment process, to enable the positioning server to subsequently position the terminal via the user plane based on the network address of the terminal. In this way, the transmission distance between the terminal and the positioning server may be shortened, and the transmission duration required for data transmission between the terminal and the positioning server may be further reduced, so that the latency in positioning the terminal by the positioning server can be shortened.

In a possible design, that the first network element sends the second positioning request information to the positioning server includes: The first network element sends the second positioning request information to the positioning server via a network exposure function NEF network element.

In a possible design, that the first network element determines, based on a positioning latency requirement carried in the first positioning request information, that the positioning requester has a high requirement for latency includes: When determining that the positioning latency requirement is less than or equal to a preset duration threshold, the first network element determines that the positioning requester has a high requirement for latency. That the positioning requester has a high requirement for latency is expressed as the following: A low latency is required when the positioning requester requests to position the terminal.

By applying the foregoing design, when determining the positioning latency requirement carried in the first positioning request information is less than or equal to the preset duration threshold, the first network element determines a latency requirement for positioning the terminal, to satisfy a requirement of the positioning requester for quickly positioning the terminal.

In a possible design, that the first network element determines, based on first indication information carried in the first positioning request information, that the positioning requester has a high requirement for latency includes: When the first indication information indicates a low-latency positioning service, the first network element determines, based on the first indication information, that the positioning requester has a high requirement for latency. A low-latency service is expressed as that a latency required by a positioning service is low, where the positioning service is used by the positioning requester to request to position the terminal.

By applying the foregoing design, the first network element determines, based on the first indication information carried in the first positioning request information and indicating the low-latency service, a latency requirement for positioning the terminal, to satisfy a requirement of the positioning requester for quickly positioning the terminal.

In a possible design, the information about the positioning server is a data network name DNN or an internet protocol IP address corresponding to the positioning server.

In a possible design, the positioning requester is the terminal or an external client having a positioning requirement.

By applying the foregoing design, the first network element may support positioning requirements of different positioning requesters for the terminal.

According to a second aspect, this application further provides a MEC-based positioning method. The method includes: A terminal receives measurement request information that is sent by a positioning server through a data connection between the terminal and the positioning server, where the measurement request information carries a network address of the terminal; and the terminal reports measurement data obtained through measurement to the positioning server through the data connection, to enable the positioning server to obtain second location information of the terminal by calculation based on the measurement data.

By applying the foregoing design, in a process of positioning the terminal, the terminal may interact with the positioning server through a user plane transmission path of the terminal, to avoid a problem that a positioning latency is long, where the problem is caused by interaction performed through a control plane transmission path, that is, forwarding performed via the first network element. In this way, a transmission distance between the terminal and the positioning server may be further shortened, and an objective of reducing transmission duration required for data transmission between the terminal and the positioning server may be achieved, so that the positioning latency of the terminal can be shortened, thereby improving user experience.

In a possible design, before the terminal receives the measurement request information that is sent by the positioning server through the data connection between the terminal and the positioning server, the method further includes: The terminal receives network trigger information sent by a first network element, where the network trigger information includes information about the positioning server; and the terminal sends, to an SMF network element based on the network trigger information, establishment request information for establishing the data connection between the terminal and the positioning server, to establish the data connection.

By applying the foregoing design, when the data connection corresponding to the terminal is not established, the terminal may send, to the SMF network element, the establishment request information for establishing the data connection between the terminal and the positioning server, to trigger the SMF network element to establish the data connection corresponding to the terminal, to enable the positioning server and the terminal to subsequently interact with each other through the data connection. In this way, the transmission distance between the terminal and the positioning server may be shortened, and the transmission duration required for data transmission between the terminal and the positioning server may be further reduced, so that the latency in positioning the terminal by the positioning server can be shortened.

According to a third aspect, this application further provides a MEC-based positioning method. The method includes: A positioning server receives second positioning request information sent by a first network element, where the second positioning request information carries a network address of a terminal; the positioning server sends measurement request information to the terminal through a data connection between the terminal and the positioning server and based on the network address of the terminal that is carried in the second positioning request information, where the measurement request information is used to request the terminal to report measurement data; and the positioning server receives the measurement data reported by the terminal through the data connection, and obtains second location information of the terminal by calculation based on the measurement data.

By applying the foregoing design, in a process of positioning the terminal, the positioning server may interact with the terminal through a user plane transmission path of the terminal, to avoid a problem that a positioning latency is long, where the problem is caused by interaction performed through a control plane transmission path, that is, forwarding performed via the first network element. In this way, a transmission distance between the terminal and the positioning server may be further shortened, and an objective of reducing transmission duration required for data transmission between the terminal and the positioning server may be achieved, so that the positioning latency of the terminal can be shortened, thereby improving user experience.

In a possible design, that the positioning server sends measurement request information to the terminal through a data connection between the terminal and the positioning server and based on the network address of the terminal that is carried in the second positioning request information includes: The positioning server sends the network address of the terminal and the measurement request information to a user plane function UPF network element, to enable the UPF to forward the measurement request information to the terminal based on the network address of the terminal through the data connection.

By applying the foregoing design, the positioning server forwards measurement information to the terminal based on the network address of the terminal via the UPF network element, so that the measurement information may be sent to the terminal through the user plane transmission path of the terminal, to avoid a problem that a positioning latency is long, where the problem is caused by interaction performed through the control plane transmission path, that is, forwarding performed via an AMF network element. In this way, the positioning latency of the terminal can be further shortened, thereby improving user experience.

In a possible design, the method further includes: If a positioning requester is the terminal, the positioning server feeds back the second location information to the terminal via a network exposure function NEF network element; or if a positioning requester is an external client having a positioning requirement, the positioning server feeds back the second location information to the external client via a service capability exposure function GMLC network element.

By applying the foregoing design, the positioning server may support positioning requirements of different positioning requesters for the terminal.

According to a fourth aspect, this application further provides a first network element. The first network element has a function of implementing the method in the first aspect or any one of the possible designs of the first aspect. The function may be implemented by hardware, or may be implemented by executing corresponding software by the hardware. The hardware or the software includes one or more modules corresponding to the foregoing function. For example, the hardware or the software includes a receiving unit, a processing unit, and a sending unit.

In a possible design, the first network element may alternatively be a chip or an integrated circuit.

In a possible design, the first network element may include a memory and a processor. The memory is configured to store a program executed by the processor. When the program is executed by the processor, the first network element may perform the method in the first aspect or any one of the possible designs of the first aspect.

According to a fifth aspect, this application further provides a first network element. The first network element includes at least one processor and a memory. The memory stores one or more computer programs. When the one or more computer programs stored in the memory are executed by the at least one processor, the first network element is enabled to perform the method in the first aspect or any one of the possible designs of the first aspect.

According to a sixth aspect, this application further provides a computer-readable storage medium. The computer-readable storage medium includes a computer program. When the computer program is run on a computer, the computer is enabled to perform the method in the first aspect or any one of the possible designs of the first aspect.

According to a seventh aspect, this application further provides a program product. When the program product is run on a computer, the computer is enabled to perform the method in the first aspect or any one of the possible designs of the first aspect.

According to an eighth aspect, this application further provides a chip. The chip may be coupled to a memory in a first network element, and is configured to invoke a computer program stored in the memory and perform the method in the first aspect or any one of the possible designs of the first aspect.

For beneficial effects of the fourth aspect to the eighth aspect and the possible designs of the fourth aspect to the eighth aspect, refer to the foregoing descriptions of beneficial effects of the method in the first aspect and any one of the possible designs of the first aspect.

According to a ninth aspect, this application further provides a terminal. The terminal has a function of implementing the method in the second aspect or any one of the possible designs of the second aspect. The function may be implemented by hardware, or may be implemented by executing corresponding software by the hardware. The hardware or the software includes one or more modules corresponding to the foregoing function. For example, the hardware or the software includes a receiving unit and a sending unit.

In a possible design, the terminal may alternatively be a chip or an integrated circuit.

In a possible design, the terminal may include a memory and a processor. The memory is configured to store a program executed by the processor. When the program is executed by the processor, the terminal may perform the method in the second aspect or any one of the possible designs of the second aspect.

According to a tenth aspect, this application further provides a terminal. The terminal includes at least one processor and a memory. The memory stores one or more computer programs. When the one or more computer programs stored in the memory are executed by the at least one processor, the terminal is enabled to perform the method in the second aspect or any one of the possible designs of the second aspect.

According to an eleventh aspect, this application further provides a computer-readable storage medium. The computer-readable storage medium includes a computer program. When the computer program is run on a computer, the computer is enabled to perform the method in the second aspect or any one of the possible designs of the second aspect.

According to a twelfth aspect, this application further provides a program product. When the program product is run on a computer, the computer is enabled to perform the method in the second aspect or any one of the possible designs of the second aspect.

According to a thirteenth aspect, this application further provides a chip. The chip may be coupled to a memory in a terminal, and is configured to invoke a computer program stored in the memory and perform the method in the second aspect or any one of the possible designs of the second aspect.

For beneficial effects of the ninth aspect to the thirteenth aspect and the possible designs of the ninth aspect to the thirteenth aspect, refer to the foregoing descriptions of beneficial effects of the method in the second aspect and any one of the possible designs of the second aspect.

According to a fourteenth aspect, this application further provides a positioning server. The positioning server has a function of implementing the method in the third aspect or any one of the possible designs of the third aspect. The function may be implemented by hardware, or may be implemented by executing corresponding software by the hardware. The hardware or the software includes one or more modules corresponding to the foregoing function. For example, the hardware or the software includes a receiving unit, a processing unit, and a sending unit.

In a possible design, the positioning server may alternatively be a chip or an integrated circuit.

In a possible design, the positioning server may include a memory and a processor. The memory is configured to store a program executed by the processor. When the program is executed by the processor, the positioning server may perform the method in the third aspect or any one of the possible designs of the third aspect.

According to a fifteenth aspect, this application further provides a positioning server. The positioning server includes at least one processor and a memory. The memory stores one or more computer programs. When the one or more computer programs are executed by the at least one processor, the positioning server is enabled to perform the method in the third aspect or any one of the possible designs of the third aspect.

According to a sixteenth aspect, this application further provides a computer-readable storage medium. The computer-readable storage medium includes a computer program. When the computer program is run on a computer, the computer is enabled to perform the method in the third aspect or any one of the possible designs of the third aspect.

According to a seventeenth aspect, this application further provides a program product. When the program product is run on a computer, the computer is enabled to perform the method in the third aspect or any one of the possible designs of the third aspect.

According to an eighteenth aspect, this application further provides a chip. The chip may be coupled to a memory in a positioning server, and is configured to invoke a computer program stored in the memory and perform the method in the third aspect or any one of the possible designs of the third aspect.

For beneficial effects of the fourteenth aspect to the eighteenth aspect and the possible designs of the fourteenth aspect to the eighteenth aspect, refer to the foregoing descriptions of beneficial effects of the method in the third aspect and any one of the possible designs of the third aspect.

According to a nineteenth aspect, this application further provides a wireless communication system, where the wireless communication system includes a first network element and a positioning server. The first network element is configured to perform steps performed by the first network element in the first aspect or the solutions provided in embodiments of this application. The positioning server is configured to perform steps performed by the positioning server in the third aspect or the solutions provided in embodiments of this application.

In a possible design, the wireless communication system may further include a terminal, and the terminal is configured to perform steps performed by the terminal in the second aspect or the solutions provided in embodiments of this application.

In a possible design, the wireless communication system may further include another device that interacts with the first network element, the positioning server, or the terminal in the solutions provided in embodiments of this application. For example, the another device is a session management network element or an access device. This is not specifically limited in embodiments of this application.

DESCRIPTION OF EMBODIMENTS

To make objectives, technical solutions, and advantages of this application clearer, the following describes technical solutions in embodiments of this application in detail with reference to the accompanying drawings in embodiments of this application.

Figure 1:
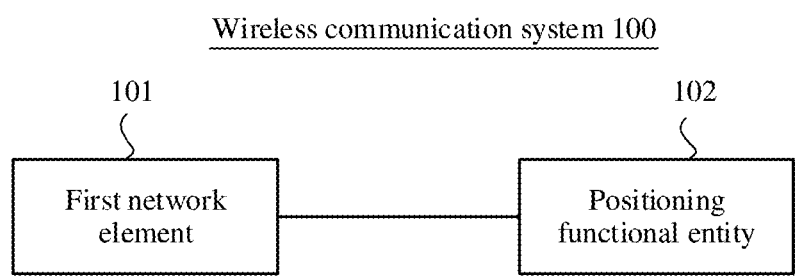
FIG. 1 is a schematic diagram of an architecture of a wireless communication system to which an embodiment of this application is applicable.

FIG. 1 is a schematic diagram of an architecture of a wireless communication system to which an embodiment of this application is applicable. The wireless communication system 100 may include a first network element 101 and a positioning functional entity 102.

It should be understood that the wireless communication system 100 provided in embodiments of this application is applicable to both a low-frequency scenario (sub 6G) and a high-frequency scenario (above 6G). Application scenarios of the wireless communication system 100 provided in embodiments of this application include but are not limited to a global system for mobile communications (global system for mobile communications, GSM), a code division multiple access (code division multiple access, CDMA) system, a wideband code division multiple access (wideband code division multiple access, WCDMA) system, a general packet radio service (general packet radio service, GPRS) system, a long term evolution (long term evolution, LTE) system, an LTE frequency division duplex (frequency division duplex, FDD) system, an LTE time division duplex (time division duplex, TDD) system, a universal mobile telecommunications system (universal mobile telecommunications system, UMTS), a worldwide interoperability for microwave access (worldwide interoperability for microwave access, WiMAX) communication system, a future 5th generation (5th generation, 5G) system, a new radio (new radio, NR) communication system, or the like.

It should be understood that, in embodiments of this application, the first network element 101 and the positioning functional entity 102 may directly communicate with each other, or may communicate with each other through forwarding by another device. This is not specifically limited in embodiments of this application.

The first network element 101 is configured to receive first positioning request information sent by a positioning requester, where the first positioning request information is used to request to position a terminal, and the first positioning request information carries identification information of the terminal.

The first network element 101 is further configured to determine, based on the first positioning request information, a positioning functional entity 102 for positioning the terminal, where the positioning functional entity 102 is a positioning server.

The first network element 101 is further configured to: obtain second positioning request information based on a first positioning request message; and send the second positioning request information to the positioning server, to trigger the positioning server to position the terminal via a user plane.

The positioning functional entity 102 is configured to: receive the second positioning request information sent by the first network element 101; and position the terminal via the user plane based on the second positioning request information.

In the wireless communication system provided in this embodiment of this application, after receiving the first positioning request information that is sent by the positioning requester and that is used to request to position the terminal, the first network element may obtain the second positioning request information, and send the second positioning request information to the positioning server, to trigger the positioning server to position the terminal via the user plane. Based on the wireless communication system provided in this embodiment of this application, the positioning server may position the terminal via the user plane. Therefore, data exchange between the positioning server and the terminal does not need to be forwarded through a control plane channel, that is, to be forwarded via the first network element. In this way, a transmission distance between the terminal and the positioning server may be shortened, and transmission duration required for data transmission between the terminal and the positioning server may be further reduced, so that a latency in positioning the terminal by the positioning server can be shortened.

In this embodiment of this application, the first network element 101 may include but is not limited to a mobility management network element and a gateway mobile location center. When the first network element 101 is a mobility management network element, in addition to the foregoing functions, the first network element 101 may be further configured for mobility management in a mobile network, for example, user location update, user network registration, or user handover. In a 5th generation (5th generation, 5G) communication system, a network element or an entity corresponding to a mobility management network element may be an access and mobility management (access and mobility management function, AMF) network element in a 5G network architecture. Namf is a service-based interface provided by the AMF network element. The AMF network element may communicate with another network function through the Namf. In a future communication system such as a 6th generation (the 6th generation, 6G) system, the mobility management network element may still be an AMF network element, or the mobility management network element has another name. This is not limited in embodiments of this application. When the first network element 101 is a gateway mobile location center, in addition to the foregoing functions, the first network element 101 may be further configured to process a positioning request of a positioning service and select a proper mobility management network element for the positioning service. In a 5G communication system, the gateway mobile location center may be a gateway mobile location center (gateway mobile location center, GMLC). In a future communication system such as a 6G communication system, the gateway mobile location center may still be a GMLC, or the gateway mobile location center has another name. This is not limited in embodiments of this application. In the following, an example in which the first network element 101 is a mobility management network element is used.

In some embodiments, in addition to the foregoing functions, the positioning functional entity 102 may further be configured to: manage a positioning request of a positioning service, allocate a positioning resource, obtain location information of a terminal and return the location information to a related network element, and the like. In a 5G wireless communication system, a network element or an entity corresponding to the positioning functional entity 102 may be a positioning server in the 5G wireless communication system.

Figure 2:
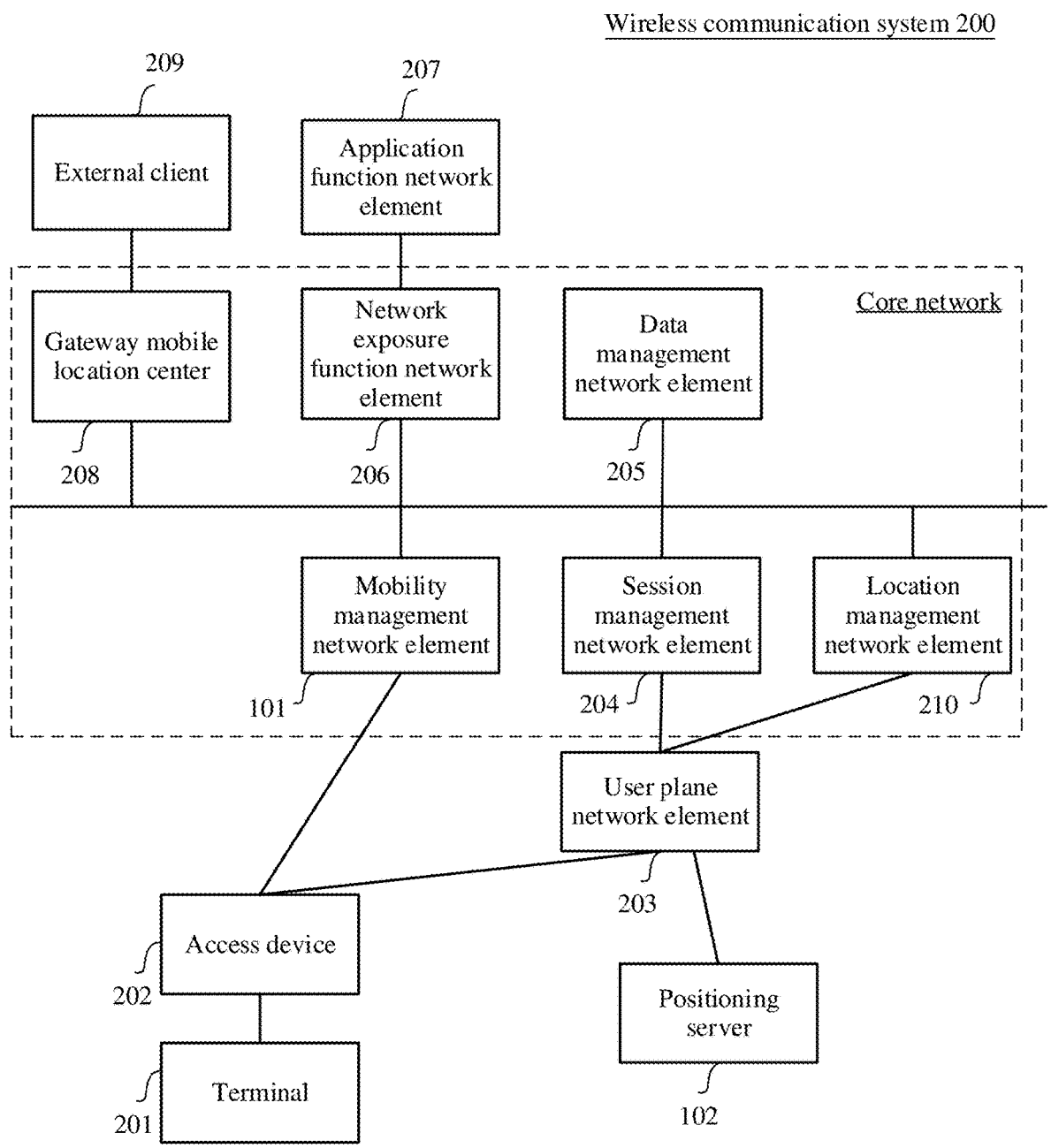
FIG. 2 is a schematic diagram of an architecture of another wireless communication system to which an embodiment of this application is applicable.

FIG. 2 is a schematic diagram of an architecture of another wireless communication system to which an embodiment of this application is applicable. In addition to the first network element 101 in FIG. 1, namely, a mobility management network element 101 (where in FIG. 2, a gateway mobile location center is identified as 208, to distinguish the gateway mobile location center from the mobility management network element) and the positioning functional entity 102 in FIG. 1, namely, a positioning server 102, the wireless communication system 200 may further include a terminal 201, an access device 202, a user plane network element 203, a session management network element 204, a data management network element 205, a network exposure function network element 206, an application function network element 207, an external client 209, and a location management network element 210.

The terminal 201 may be a device having a wireless transceiver function. The terminal 201 may be deployed on land, where the terminal may be indoor or outdoor device and may be handheld or vehicle-mounted; may be deployed on water (for example, on a ship); or may be deployed in the air (for example, on an airplane, a balloon, or a satellite). The terminal 201 can communicate with one or more network devices in one or more communication systems, and accept a network service provided by the access device 202. For example, the terminal 201 in this embodiment of this application may be a mobile phone (which is also referred to as a "cellular" phone), a computer having a mobile terminal, or the like. Alternatively, the terminal 201 may be user equipment (user equipment, UE), a terminal (terminal), a mobile station (mobile station, MS), a mobile phone (mobile phone), a tablet computer (pad), a computer with a wireless transceiver function, a virtual reality (virtual reality, VR) terminal, an augmented reality (augmented reality, AR) terminal, a wireless terminal in industrial control (industrial control), a wireless terminal in self driving (self driving), a wireless terminal in telemedicine (remote medical), a wireless terminal in a smart grid (smart grid), a wireless terminal in transportation safety (transportation safety), a wireless terminal in a smart city (smart city), a wireless terminal in a smart home (smart home), or the like. Alternatively, the terminal 201 may be a communication chip having a communication module.

The access device 202 includes but is not limited to: a next-generation base station (gNodeB, gNB) in 5G, an evolved NodeB (evolved NodeB, eNB), a radio network controller (radio network controller, RNC), a NodeB (NodeB, NB), a base station controller (base station controller, BSC), a base transceiver station (base transceiver station, BTS), a home base station (for example, a home evolved NodeB, or a home NodeB, HNB), a baseband unit (baseBand unit, BBU), a transmission point (transmission reception point, TRP), a transmission point (transmission point, TP), a mobile switching center, and the like This is not limited in embodiments of this application. Alternatively, the access device 202 may be a communication chip having a communication module. In a process of performing the MEC-based positioning method provided in embodiments of this application, the access device 202 may serve as a radio access network (radio access network, RAN) base station to provide a wireless network connection for the terminal 201. For example, the access device 202 may serve as an access network base station in a 4G access network, namely, an evolved universal mobile telecommunications system (universal mobile telecommunications system, UMTS) terrestrial radio access network (evolved UMTS terrestrial radio access network, E-UTRAN); or the access device 202 may serve as an access network base station in a 5G access network, namely, a 5G RAN; or the access device 202 may serve as an access network base station in a future wireless communication system.

The user plane network element 203 is configured to perform packet routing and forwarding, quality of service (quality of service, QoS) processing of user plane data, and the like. In a 5G communication system, a network element or an entity corresponding to the user plane network element 203 may be a user plane function (user plane function, UPF) network element in a 5G wireless communication system. In a future communication system such as a 6th generation (6th generation, 6G) communication system, the user plane network element 203 may still be a UPF network element, or the user plane network element 203 has another name. This is not limited in embodiments of this application.

The session management network element 204 is configured to manage a session in a mobile network, for example, establish, modify, or release a session. In the 5G communication system, a network element or an entity corresponding to the session management network element 304 may be a session management function (session management function, SMF) network element in the 5G wireless communication system. In the future communication system such as the 6th generation (6th generation, 6G) communication system, the session management network element 204 may still be an SMF network element, or the session management network element 204 may have another name. This is not limited in embodiments of this application.

The data management network element 205 is configured to perform user identifier processing, access authentication, registration, mobility management, or the like. In the 5G communication system, a network element or an entity corresponding to the data management network element may be a unified data management (unified data management, UDM) network element in a 5G network architecture. Nudm is a service-based interface provided by the UDM network element, and the UDM network element may communicate with another network function through the Nudm. In the future communication system such as the 6G communication system, the data management network element 205 may still be a UDM network element, or the data management network element 205 has another name. This is not limited in embodiments of this application.

The network exposure function network element 206 mainly provides a service, to enable a 3rd generation partnership project (3rd generation partnership project, 3GPP) network to securely provide a network service capability for a third-party service provider, namely, the application function network element 207. In the 5G communication system, the network exposure function network element 206 may be a network exposure function (network exposure function, NEF) network element. Nnef is a service-based interface provided by the NEF network element, and the NEF network element may communicate with another network function through the Nnef. In the future communication system such as the 6G communication system, the network exposure function network element 206 may still be an NEF network element, or may have another name. This is not limited in embodiments of this application.

The application function network element 207 is mainly configured to provide application layer information for the 3GPP network. In the 5G communication system, the application function network element 207 may be an application function (application function, AF) network element. Naf is a service-based interface provided by the AF network element, and the AF network element may communicate with another network function through the Naf. In the future communication system such as the 6G communication system, the application function network element 207 may still be an AF network element, or may have another name. This is not limited in embodiments of this application. For example, the AF network element may include a service capability server (service capability server, SCS) or an application server (application server, AS).

The external client 209 may be a requester of location information of the terminal 201.

The location management network element 210 may be configured to manage a positioning request of a positioning service, allocate a positioning resource, obtain location information of a terminal device and return the location information to a related network element, and the like. In the 5G wireless communication system, a network element or an entity corresponding to the location management network element 210 may be a location management function (location management function, LMF) network element in the 5G wireless communication system. Nlmf is a service-based interface provided by the AMF network element, and the LMF network element may communicate with another network function through the Nlmf. In the future communication system such as the 6G communication system, the location management network element 210 may still be an LMF network element, or the location management network element 210 has another name. This is not limited in embodiments of this application.

Figure 3:
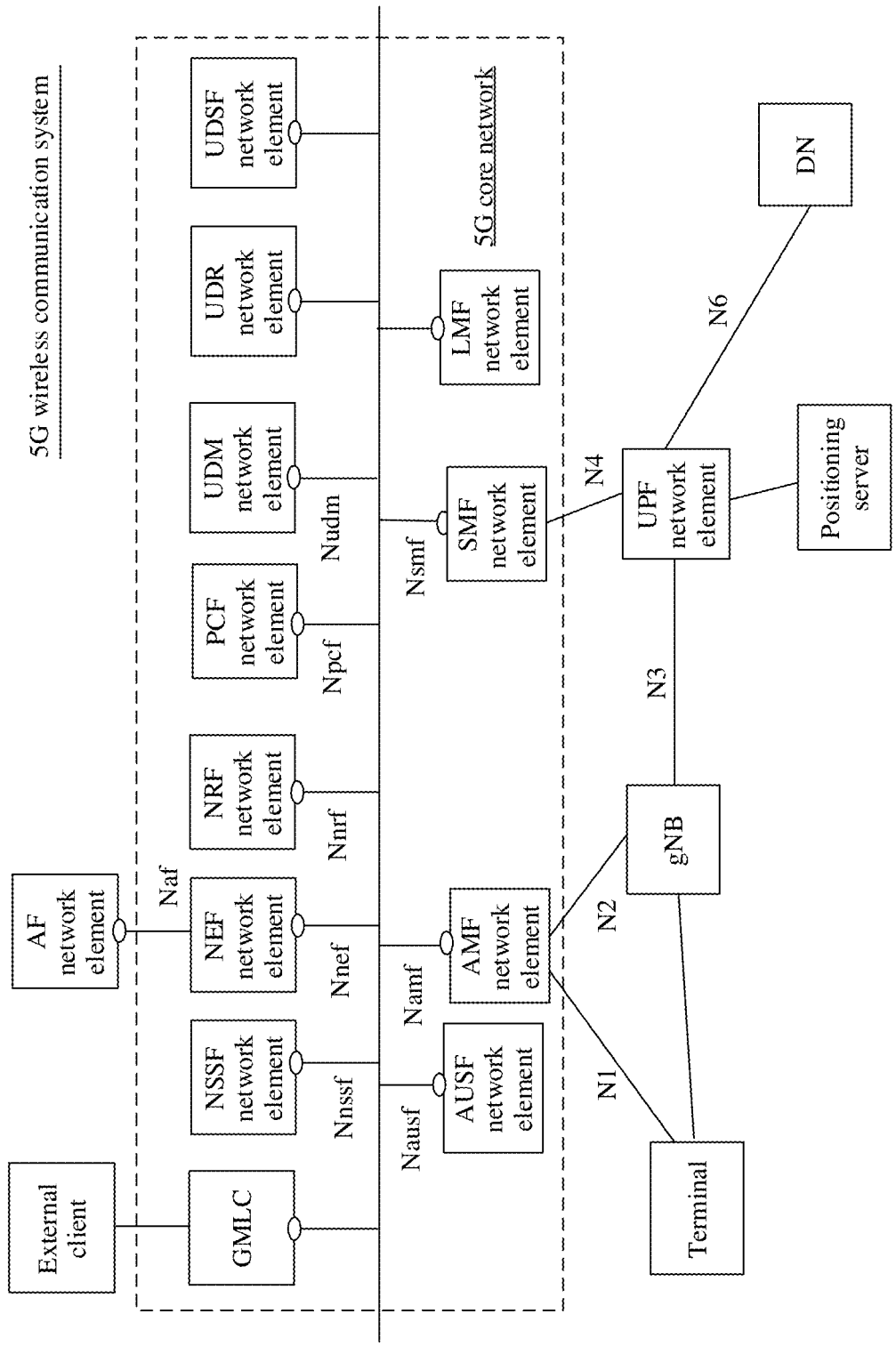
FIG. 3 is a schematic diagram of an architecture of a 5G wireless communication system to which an embodiment of this application is applicable.

In addition, FIG. 3 is a schematic diagram of an architecture of a 5G wireless communication system to which an embodiment of this application is applicable, where the 5G wireless communication system is used as an example. The wireless communication system includes the AMF network element, the LMF network element, the terminal, the gNB, the UPF network element, the SMF network element, the UDM network element, the NEF network element, the AF network element, the GMLC, and the external client that are described above. In addition, the 5G wireless communication system may further include an authentication server function (authentication server function, AUSF) network element, a network slice selection function (network slice selection function, NSSF) network element, a network repository function (network repository function, NRF) network element, a policy control function (policy control function, PCF) network element, a unified data repository (unified data repository, UDR) network element, an unstructured data storage function (unstructured data storage function, UDSF) network element, and the like. This is not specifically limited in embodiments of this application.

An N1 interface in FIG. 3 is a reference point between the terminal and the AMF network element. An N2 interface is a reference point between the gNB and the AMF network element, and is configured to send a non-access stratum (non-access stratum, NAS) message, a next generation application protocol (next generation application protocol, NGAP) message, and the like. An N3 interface is a reference point between the gNB and the UPF network element, and is configured to transmit user plane data and the like. An N4 interface is a reference point between the SMF and the UPF, and is configured to transmit information such as tunnel identification information of an N3 connection, data buffer indication information, or a downlink data notification message. An N6 interface is a reference point between the UPF network element and a data network (data network, DN), and is configured to transmit user plane data and the like.

In addition, control plane network elements such as the AUSF network element, the AMF network element, the SMF network element, the LMF network element, the NSSF network element, the NEF network element, the NRF network element, the PCF network element, the UDM network element, the UDR network element, the UDSF network element, and the AF network element shown in FIG. 3 may also perform interaction through a service-based interface. For example, a service-based interface exhibited by the AUSF network element may be Nausf; a service-based interface exhibited by the AMF network element for external connection may be Namf; a service-based interface exhibited by the SMF network element may be Nsmf; a service-based interface exhibited by the NSSG network element may be Nnssf; a service-based interface exhibited by the NEF network element may be Nnef; a service-based interface exhibited by the NRF network element may be Nnrf; a service-based interface exhibited by the PCF network element may be Npcf; a service-based interface exhibited by the UDM network element may be Nudm; and a service-based interface exhibited by the AF network element may be Naf. For related descriptions, refer to a diagram of a 5G system architecture (5G system architecture) in the 23501 standard. Details are not described herein.

It may be understood that the foregoing network elements or functions may be network elements in a hardware device, may be software functions running on dedicated hardware, or may be virtualized functions instantiated on a platform (for example, a cloud platform). One or more services may be obtained through division into the network elements or the functions. Further, services that exist independently of network functions may occur. In this application, instances of the functions, instances of services included in the functions, or instances of services that exist independently of network functions may be referred to as service instances.

Before embodiments of this application are described, some terms in this application are first described, to help a person skilled in the art have a better understanding.

Carrying may mean that a message is used to carry information or data, or may mean that the message includes the information.

In embodiments of this application, positioning request information is information used to request a positioning service for a specific terminal. A positioning service may be an immediate request (location immediate request, LIR) service or a location deferred request (location deferred request, LDR) service. Based on the positioning service, a mobile communication network may notify location information of a terminal or a location-related positioning event to a requester, namely, a positioning requester, of the positioning service. A positioning server or a location management network element may be configured to manage positioning request information for a specific terminal. Specifically, managing the positioning request information means that the positioning server or location management network element may be configured to: based on the positioning request information sent by the positioning requester, feed back location information of the terminal to a positioning requester or indicate, to the positioning requester, that a positioning event indicated by the positioning request information occurs on the terminal.

An immediate request service is a positioning service for "an immediate request and an immediate response", and a positioning request may include an LIR. In embodiments of this application, a positioning requester sends an LIR to a network element such as a mobility management network element or a gateway mobile location center of a core network in which a terminal is located, and the mobility management network element or the gateway mobile location center forwards the LIR to a positioning server or another network element such as a location management network element in a core network, so that the positioning server or the location management network element immediately feeds back location information of the terminal to the positioning requester based on the LIR.

A location deferred request service is deferrable. This means that a positioning requester subscribes to a positioning report of a terminal from the terminal, a network element of a core network in which the terminal is located, or another related network element, and the report may be triggered after a specific positioning event is met. For example, the positioning event is that the terminal moves out of or moves to an area, that a moving distance of the terminal reaches a threshold distance, or that a preset reporting periodicity is met. The report may carry location information of the terminal, and/or the report may indicate that the location event is met. For example, the report indicates that the terminal moves out of or moves to an area.

Location information of a terminal is location information of the terminal that a network element such as a location management network element or a positioning server of a core network in which the terminal is located may obtain by calculation and based on a positioning service. Specifically, for example, the location management network element or the positioning server may obtain, by calculation, the location information of the terminal based on positioning request information sent by a positioning requester and measurement data reported by the terminal, and feed back the location information of the terminal to the positioning requester. Specifically, the location management network element or the positioning server may generate the foregoing positioning event report based on the location information. The location information of the terminal may be geographical location coordinates in a location system (for example, a global positioning system (global positioning system, GPS) or a BeiDou navigation satellite system).

In embodiments of this application, a terminal is an object of a positioning service requested by a positioning requester. For example, in a 3GPP specification, a secure user plane positioning enabled terminal (secure user plane location enabled terminal, SET) is a client of a positioning service. In other words, an object, for example, an Android (Android) smartphone, of the positioning service requested by the positioning requester is the terminal defined in the 3GPP. A network element such as an LMF network element or a positioning server of a core network in which the terminal is located may provide, based on a positioning request of the positioning requester, location information of the terminal for the positioning requester, or notify the positioning requester that the terminal meets a positioning event indicated by positioning request information.

In embodiments of this application, a positioning requester is a communication device that provides a positioning service specific to a terminal for a network element such as a location management network element or a positioning server of a core network. The positioning requester may be a terminal, or may be an external client having a positioning requirement, for example, a server, a network element in a wireless communication network, or another carrier having a requirement for positioning a location of a terminal. For example, a secure user plane location (secure user plane location, SUPL) agent (agent) is an application program, namely, a location service client (location service client) defined by 3GPP, that needs to obtain location information. The SUPL agent may run in a SET, or may run in a SUPL network. If the SUPL agent runs in the SET, the positioning requester is a terminal. If the SUPL agent runs in the SUPL network, the positioning requester is an external client having a positioning requirement.

In embodiments of this application, a positioning server is deployed in a MEC manner, and may be a MEC platform or a server. A specific deployment form of the positioning server is not limited in this application. Specifically, the positioning server may be deployed on a cloud, or may be an independent computer device, a chip, or the like. The positioning server may directly exchange data with a terminal via a user plane (user plane). For example, an SUPL is a positioning protocol defined by an operation, maintenance, and management (operation, administration, and maintenance, OAM) organization. The positioning server may interact with the terminal via the user plane based on an SUPL protocol, in other words, the terminal may transmit an SUPL packet via the user plane. The SUPL packet may encapsulate information such as positioning request information and measurement data reported by the terminal and measurement request information delivered by the positioning server to the terminal.

In addition, it should be understood that terms "system" and "network" in embodiments of this application may be used interchangeably. "At least one" means one or more, and "a plurality of" means two or more. "And/or" describes an association relationship for describing associated objects and represents that three relationships may exist. For example, A and/or B may represent the following cases:

Only A exists; both A and B exist; and only B exists, where A and B may be singular or plural. The character "/" generally indicates an "or" relationship between the associated objects. The singular expression forms "one", "a", "the", "the foregoing", "this", and "the one" are also intended to include an expression form such as "one or more", unless the opposite is explicitly indicated in the context thereof. In addition, unless otherwise stated, ordinal numbers such as "first" and "second" in embodiments of this application are for distinguishing between a plurality of objects, but are not intended to limit an order, a time sequence, priorities, or importance of the plurality of objects. For example, first positioning request information and second positioning request information are merely used to distinguish between different positioning request information, but do not indicate different priorities, importance degrees, or the like of these two types of positioning request information.

Reference to "an embodiment", "some embodiments", or the like described in embodiments of this application means that one or more embodiments of this application include a specific feature, structure, or characteristic described with reference to embodiments. Therefore, statements such as "in an embodiment", "in some embodiments", "in some other embodiments", and "in other embodiments" that appear at different places in this specification do not necessarily mean referring to a same embodiment. Instead, the statements mean "one or more but not all of embodiments", unless otherwise specifically emphasized in another manner. The terms "include", "have", and their variants all mean "include but are not limited to", unless otherwise specifically emphasized in another manner.

The following specifically describes, with reference to FIG. 1 to FIG. 3, the MEC-based positioning method provided in embodiments of this application.

It should be understood that the methods shown in embodiments of this application are not only applied to wireless communication systems shown in FIG. 1 to FIG. 3, but may also be applied to another future communication system, for example, a 6G communication system. In the future communication system, functions may be the same, but names may change.

Figure 4A:
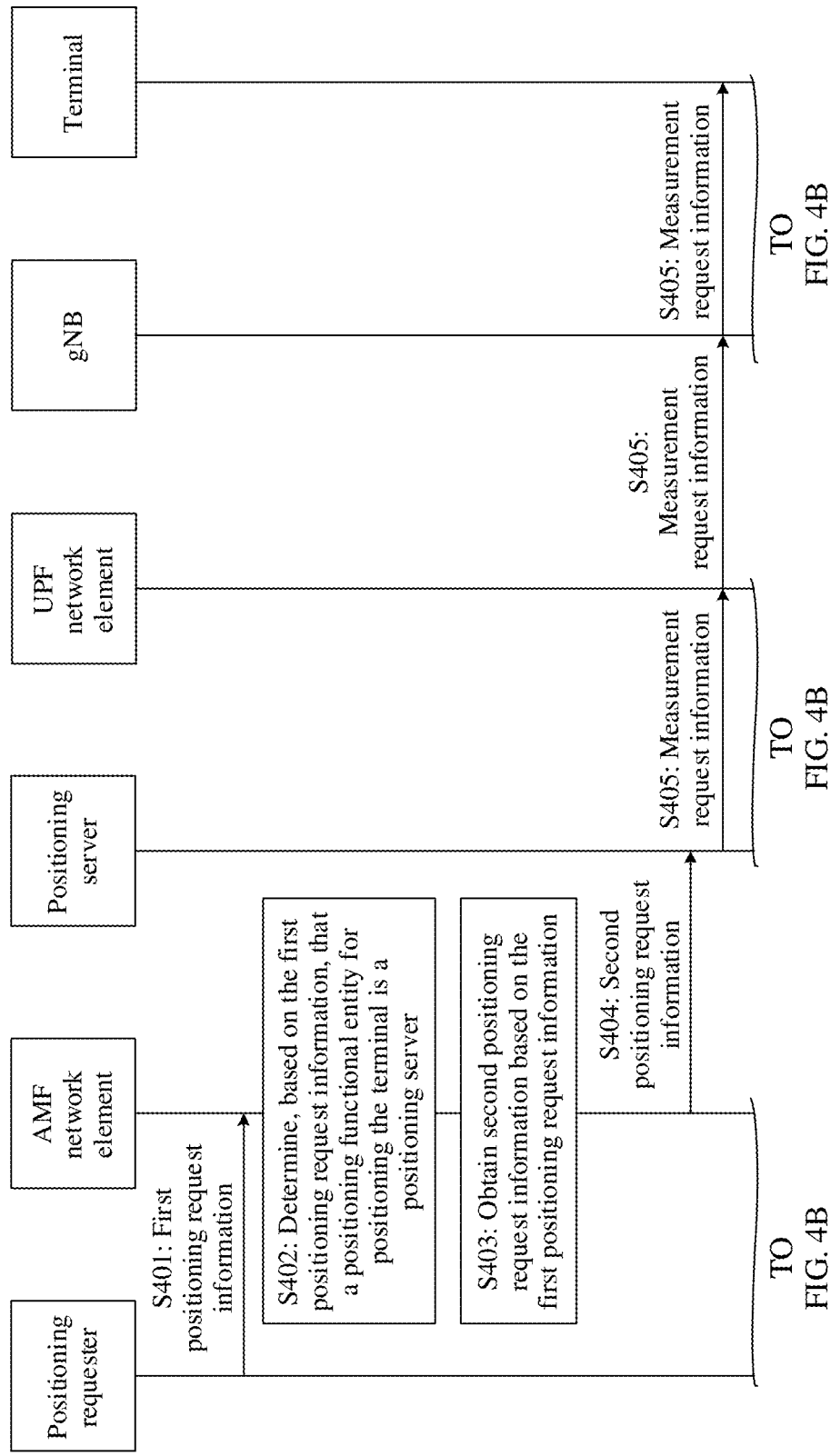
FIG. 4A and FIG. 4B are a schematic flowchart of a MEC-based positioning method according to an embodiment of this application.
Figure 4B:
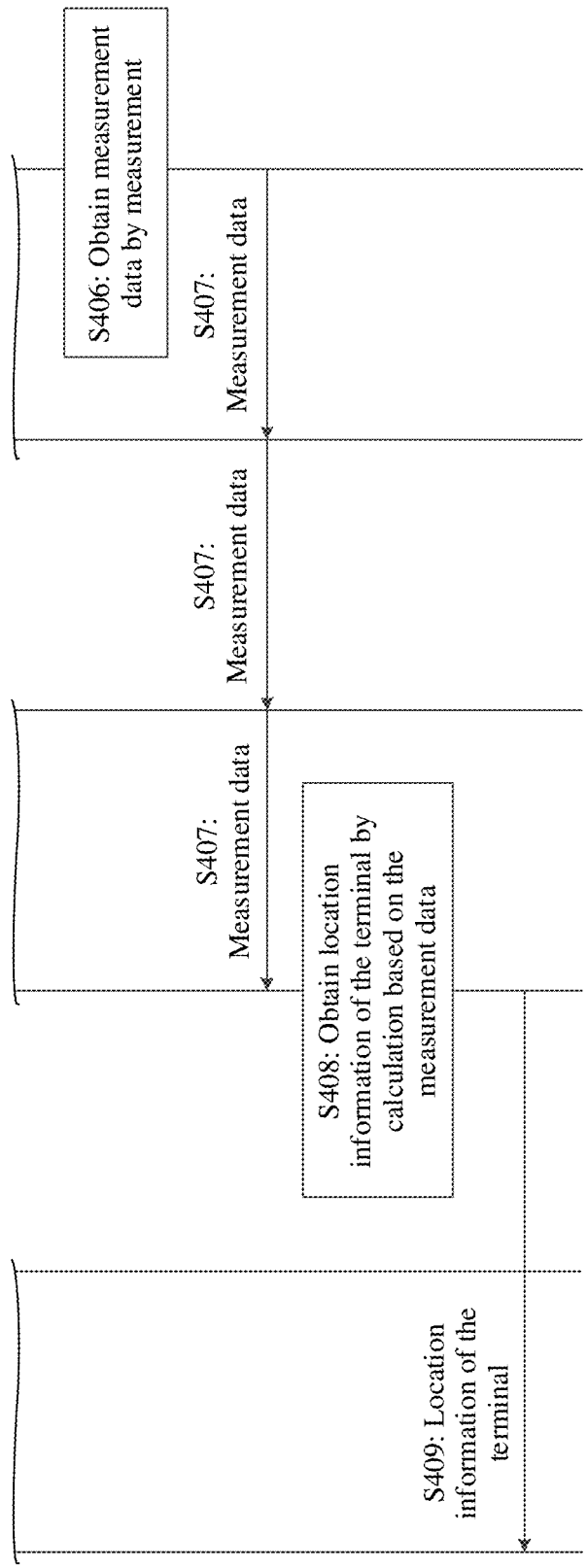

In some embodiments, an example in which the wireless communication system shown in FIG. 1 or FIG. 2 is applied to the 5G wireless communication system shown in FIG. 3 is used. FIG. 4A and FIG. 4B are a schematic flowchart of a MEC-based positioning method according to an embodiment of this application. A procedure of the method includes the following steps.

S401: A positioning requester sends first positioning request information to an AMF network element. Correspondingly, the AMF network element receives the first positioning request information sent by the positioning requester. The first positioning request information is used to request to position a terminal, and the first positioning request information carries identification information of the terminal.

In some embodiments, if the positioning requester needs to position a terminal, the positioning requester may send, to the AMF network element, the first positioning request information that carries the identification information of the terminal. The identification information of the terminal may be an international mobile equipment identity (international mobile equipment identity, IMEI) of the terminal, or a subscription permanent identifier (subscription permanent identifier, SUPI) of the terminal. Alternatively, the identification information of the terminal may be a generic public subscription identifier (generic public subscription identifier, GPSI), or other information that can identify the terminal. This is not specifically limited in embodiments of this application.

S402: The AMF network element determines, based on the first positioning request information, that a positioning functional entity for positioning the terminal is a positioning server.

In some embodiments, the first positioning request information may carry a positioning latency requirement. After receiving the first positioning request information sent by the positioning requester, the AMF network element may determine, based on the first positioning request information, that the positioning requester has a high requirement for latency. For example, before sending the first positioning information to the AMF network element, the positioning requester may insert a high requirement for latency into the first positioning request information. Correspondingly, after receiving the first positioning request information, the AMF network element may obtain the positioning latency requirement carried in the first positioning request information, so as to determine, based on the positioning latency requirement, that the positioning requester has a high requirement for latency.

For example, when determining that the positioning latency requirement carried in the first positioning request information is less than or equal to a preset duration threshold, the AMF network element determines that the positioning requester has a high requirement for latency, in other words, the AMF network element determines that the terminal needs to be quickly positioned. In this case, the AMF network element may select the positioning server to position the terminal. The positioning latency requirement may be set by the positioning requester based on a requirement, or may be a positioning latency requirement corresponding to a value-added positioning service. For example, the positioning requester subscribes to a paid positioning service. When the positioning requester positions the terminal by using the positioning service, the first positioning request information sent by the positioning requester to the AMF network element may carry the positioning latency requirement corresponding to the value-added positioning service. Then, the AMF network element may determine, based on the positioning latency requirement corresponding to the value-added positioning service, that the positioning requester has a high requirement for latency.

In some other embodiments, the first positioning request information may carry first indication information, where the first indication information indicates a low-latency positioning service. After receiving the first positioning request information sent by the positioning requester, the AMF network element may determine, based on the first indication information carried in the first positioning request information, that the positioning requester has a high requirement for latency. Optionally, the first indication information may be an indicator (indicator).

It should be noted that an example in which the first indication information is used to directly indicate the low-latency service is used above. Certainly, in a specific implementation process, the first indication information may be further used to indirectly indicate the low-latency service. This is not limited in embodiments of this application. For example, the first indication information may be identification information of a positioning service. After receiving the first positioning request information sent by the positioning requester, the AMF network element may indirectly determine, based on the first indication information carried in the first positioning request information, that the positioning service identified by the first indication information is a low-latency service. For example, the AMF network element may store a first correspondence between at least one positioning service and identification information and a second correspondence between at least one positioning service and a latency requirement. After receiving the first positioning request information sent by the positioning requester, the AMF network element may determine, based on the first indication information and the first correspondence, the positioning service identified by the first indication information. Then, when determining, based on the positioning service identified by the first indication information and the second correspondence, that a latency requirement of the positioning service identified by the first indication information is a high requirement, the AMF network element may determine that the positioning service identified by the first indication information is a low-latency service.

In a specific implementation process, the positioning latency requirement and the first indication information in this embodiment may be combined and used. This is not limited in embodiments of this application.

It should be noted that, in embodiments of this application, that the positioning requester has a high requirement for latency may be expressed as the following: A low latency is required when the positioning requester requests to position the terminal. For example, a preset duration threshold is 8 milliseconds. When a latency required by the positioning requester to request to position the terminal is 5 milliseconds, it may indicate that the positioning requester has a high requirement for latency. Correspondingly, a low-latency service may be expressed as that a latency required by a positioning service is low, where the positioning service is used by the positioning requester to request to position the terminal.

In this embodiment of this application, the AMF network element determines, based on the positioning latency requirement or the first indication information carried in the first positioning request information, a latency requirement for positioning the terminal, to satisfy a requirement of the positioning requester for quickly positioning the terminal.

In some embodiments, when determining that the positioning requester has a high requirement for latency, the AMF network element may determine that a positioning functional entity for positioning the terminal is a positioning server.

In this embodiment of this application, the AMF network element may determine, based on the first positioning request information, that the positioning functional entity for positioning the terminal is the positioning server, to enable the positioning server to subsequently position the terminal via a user plane based on second positioning request information sent by the AMF network element, and avoid a problem that a positioning latency is long, where the problem is caused by interaction performed through a control plane transmission path, that is, forwarding performed via the AMF network element. In this way, a positioning server that is close to the terminal and an access device may be selected to position the terminal. Therefore, a transmission distance between the terminal and the positioning server may be shortened, and transmission duration required for data transmission between the terminal and the positioning server may be further reduced, so that the positioning latency of the terminal can be shortened, thereby improving user experience.

In a specific implementation process, after determining that the positioning functional entity for positioning the terminal is a positioning server, the AMF network element may select, from at least one positioning server, the positioning server for positioning the terminal. For example, a data management network element (for example, the UDM network element in FIG. 3) may prestore configuration information of the at least one positioning server. The AMF network element may determine, based on first location information of the terminal and the configuration information of the at least one positioning server, the positioning server for positioning the terminal. Optionally, the configuration information of the at least one positioning server may include area information managed by the at least one positioning server; the area information managed by the at least one positioning server is tracking area identity (tracking area identity, TAI) information managed by the at least one positioning server; and the first location information of the terminal is target TAI information. In the following, to distinguish between the target TAI information and geographic location information of the terminal, the first location information is used to represent the target TAI information of the terminal, and second location information is used to represent the geographic location information of the terminal.

For example, after receiving the first positioning request information sent by the positioning requester, the AMF network element may obtain, based on the identification information of the terminal carried in the first positioning request information, the target TAI information of the terminal from the UDM network element, and obtain the configuration information of the at least one positioning server stored in the UDM network element. Then, when the AMF network element determines that configuration information of a positioning server in the at least one positioning server includes the target TAI information of the terminal, the AMF network element may determine that the positioning server is the positioning server for positioning the terminal.

The at least one positioning server may be a positioning server in an access network in which the terminal is located, or may be a positioning server managed by a wireless communication system in which the terminal is located. This is not specifically limited in embodiments of this application.

In this embodiment of this application, the AMF network element determines, from the at least one positioning server based on the target TAI information of the terminal and the configuration information of the at least one positioning server, the positioning server for positioning the terminal, to ensure that the determined positioning server is close to the terminal and the access network device (for example, the gNB in FIG. 3). In this way, the transmission distance between the positioning server and the terminal may be shortened, and the transmission duration required for data transmission between the terminal and the positioning server may be further reduced, so that the latency in positioning the terminal by the positioning server can be shortened.

S403: The AMF network element obtains the second positioning request information based on the first positioning request information. The second positioning request information carries a network address of the terminal.

In some embodiments, the AMF network element may obtain the network address of the terminal based on the identification information of the terminal, and then may obtain the second positioning request information based on the first positioning request information and the network address of the terminal. The second positioning request information includes the network address of the terminal. After obtaining the network address of the terminal, the AMF network element may obtain the second positioning request information based on the first positioning request information. In embodiments of this application, a specific implementation in which the AMF network element obtains the second positioning request information based on the first positioning request information is not limited. For example, the AMF network element may extract the positioning latency requirement or the first indication information carried in the first positioning request information, and then insert the network address of the terminal into the first positioning request information to obtain the second positioning request information. The network address of the terminal may include but is not limited to an internet protocol (internet protocol, IP) address, a media access control (media access control, MAC) address (address), and the like.

In this embodiment of this application, the AMF network element may obtain, based on the identification information of the terminal, the network address of the terminal, to enable the positioning server to subsequently position the terminal via the user plane based on the network address of the terminal. In this way, the transmission distance between the positioning server and the terminal may be shortened, and the transmission duration required for data transmission between the terminal and the positioning server may be further reduced, so that the latency in positioning the terminal by the positioning server can be shortened.

S404: The AMF network element sends the second positioning request information to the positioning server. Correspondingly, the positioning server may receive the second positioning request information sent by the AMF network element. The second positioning request information is configured to trigger the positioning server to position the terminal via the user plane.

In some embodiments, the AMF network element may send the second positioning request information to the positioning server via a network exposure function network element (for example, the NEF network element in FIG. 3).

S405: The positioning server sends measurement request information to the terminal via the user plane based on the second positioning request information. Correspondingly, the terminal receives the measurement request information from the positioning server. The measurement request information carries the network address of the terminal, and indicates the terminal to report measurement data. The measurement data is used by the positioning server to obtain the second location information of the terminal through calculation.

In some embodiments, after receiving the second positioning request information from the AMF network element, the positioning server may select a proper positioning calculation method, then determine, according to the positioning calculation method, the measurement data that needs to be provided by the terminal, and send the measurement request information to the terminal device via the user plane, to indicate the terminal to report the measurement data. For example, the positioning server may send the measurement request information to the terminal through a data connection corresponding to the terminal and based on the second positioning request information. Correspondingly, the terminal receives the measurement request information from the positioning server through the data connection. The data connection may include but is not limited to a packet data unit (packet data unit, PDU) session (session).

For example, the positioning server may determine, based on the network address of the terminal carried in the second positioning request information, that a destination address of the measurement request information is the network address of the terminal. Then, the positioning server may send the network address of the terminal and the measurement request information to a user plane network element (for example, the UPF network element in FIG. 3) that is in the data connection corresponding to the terminal. In this way, the UPF network element forwards the measurement request information to the terminal based on the network address of the terminal through the data connection. Correspondingly, the terminal receives the measurement request information from the positioning server through the data connection. For example, refer to FIG. 3. A transmission path of the measurement request information may be "the positioning server-the UPF network element-the access network device-the terminal". In other words, the data connection includes the positioning server, the UPF network element, the access network device (for example, the gNB in FIG. 3), and the terminal.

In this embodiment of this application, the positioning server forwards measurement information to the terminal based on the network address of the terminal via the UPF network element, so that the measurement information may be sent to the terminal through a user plane transmission path of the terminal, to avoid a problem that a positioning latency is long, where the problem is caused by interaction performed through the control plane transmission path, that is, forwarding performed via the AMF network element. In this way, the positioning latency of the terminal can be further shortened, thereby improving user experience.

"Through a data connection corresponding to the terminal" may be represented as "through a user plane transmission path of the terminal". Correspondingly, "via a UPF network element that is in a data connection corresponding to the terminal" may be represented as "via a UPF network element that is in a user plane transmission path of the terminal". This is not specifically limited in embodiments of this application.

In this embodiment of this application, in a process of positioning the terminal, the positioning server may interact with the terminal through the user plane transmission path of the terminal, to avoid a problem that a positioning latency is long, where the problem is caused by interaction performed through the control plane transmission path, that is, forwarding performed via the AMF network element. In this way, the positioning server that is close to the terminal and the access device may be selected to position the terminal, the transmission distance between the terminal and the positioning server may be shortened, and the transmission duration required for data transmission between the terminal and the positioning server may be further reduced, so that the positioning latency of the terminal can be shortened, thereby improving user experience.

Optionally, in an implementation scenario of this embodiment of this application, the MEC-based positioning method further includes the following steps S406 to S409.

S406: The terminal obtains the measurement data by measurement.

In some embodiments, when receiving the measurement request information from the positioning server, the terminal may obtain, based on the measurement request information, the measurement data by measurement. For example, the terminal may perform measurement and collection (where for example, the terminal measures signal quality of a serving cell in which the terminal is located and a neighboring cell of the serving cell) based on measurement parameters configured by a network side (for example, a gNB) for the terminal, to obtain the measurement data.

S407: The terminal sends the measurement data to the positioning server. Correspondingly, the positioning server receives the measurement data from the terminal.

In some embodiments, the terminal may send the measurement data to the positioning server through the data connection corresponding to the terminal. For example, the terminal may send the measurement data to the UPF network element that is in the data connection corresponding to the terminal, to enable the UPF network element to forward the measurement data to the positioning server based on the network address of the terminal through the data connection. Optionally, refer to FIG. 3. A transmission path of the measurement data may be "the terminal-the gNB-the UPF network element-the positioning server".

S408: The positioning server obtains the second location information of the terminal by calculation based on the measurement data.

In some embodiments, after receiving the measurement data, the positioning server may obtain the second location information of the terminal by calculation according to the positioning calculation method that is selected in S405.

S409: The positioning server sends the second location information of the terminal to the positioning requester.

In some embodiments, after obtaining, by calculation, the second location information of the terminal, the positioning server may feed back the location information of the terminal to the positioning requester via a gateway mobile location center network element (for example, the GMLC network element in FIG. 3).

It should be noted that, in FIG. 4A and FIG. 4B, an example in which the positioning requester is an external client having a positioning requirement is used. When the positioning requester is a terminal, after obtaining, by calculation, the second location information of the terminal, the positioning server may feed back the second location information of the terminal to the terminal via a network exposure function network element (for example, the NEF network element in FIG. 3).

In embodiments of this application, the positioning server may support positioning requirements of different positioning requesters for the terminal.

In this embodiment of this application, in a process of positioning the terminal, the terminal may interact with the positioning server through the user plane transmission path of the terminal. This may also avoid forwarding performed via the AMF network element, that is, interaction performed through the control plane transmission path. In this way, the transmission distance between the terminal and the positioning server may be shortened, and the transmission duration required for data transmission between the terminal and the positioning server may be further reduced. Therefore, a positioning latency of the terminal can be shortened, thereby improving user experience.

Figure 5A:
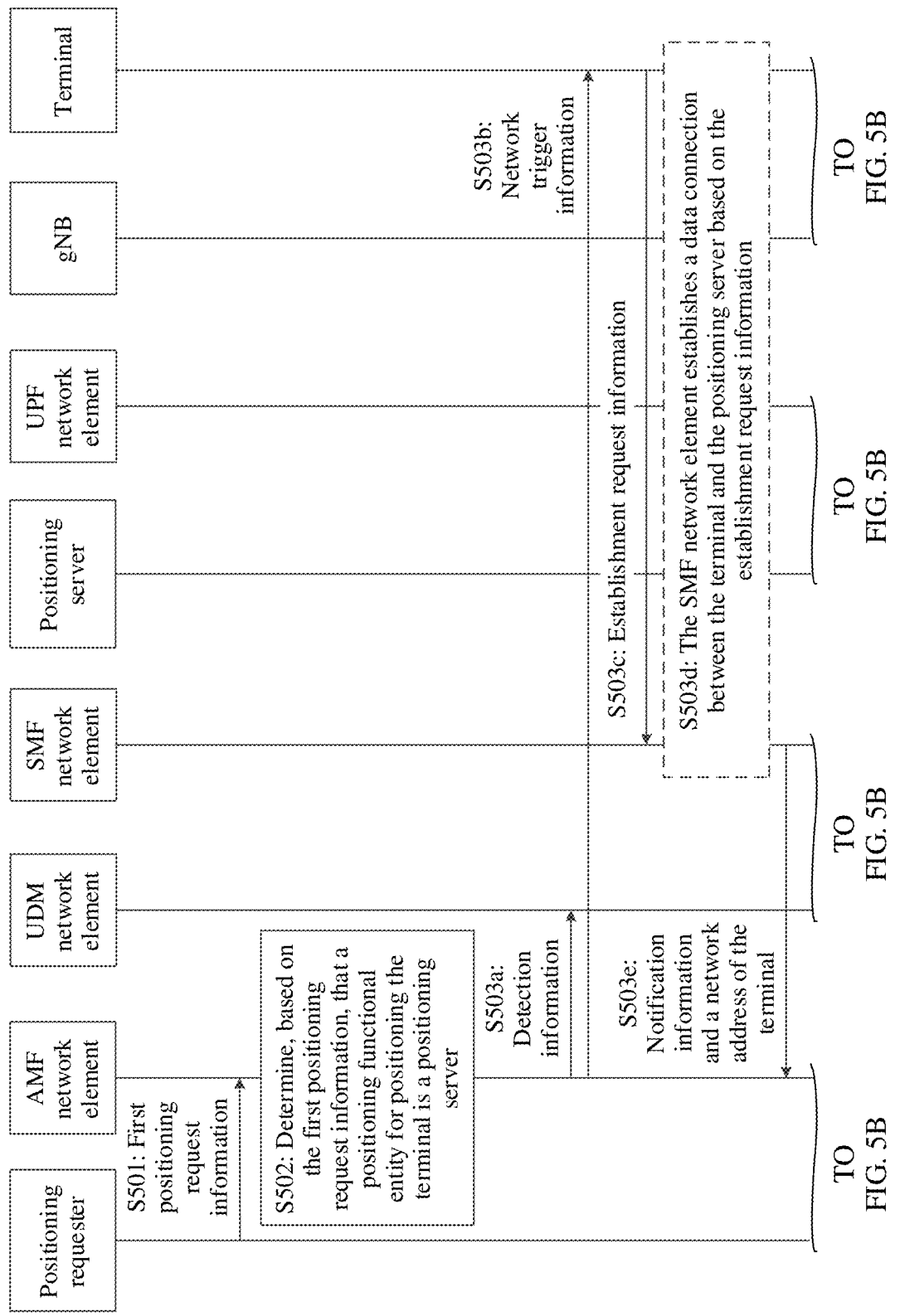
FIG. 5A and FIG. 5B are a schematic flowchart of another MEC-based positioning method according to an embodiment of this application.
Figure 5B:
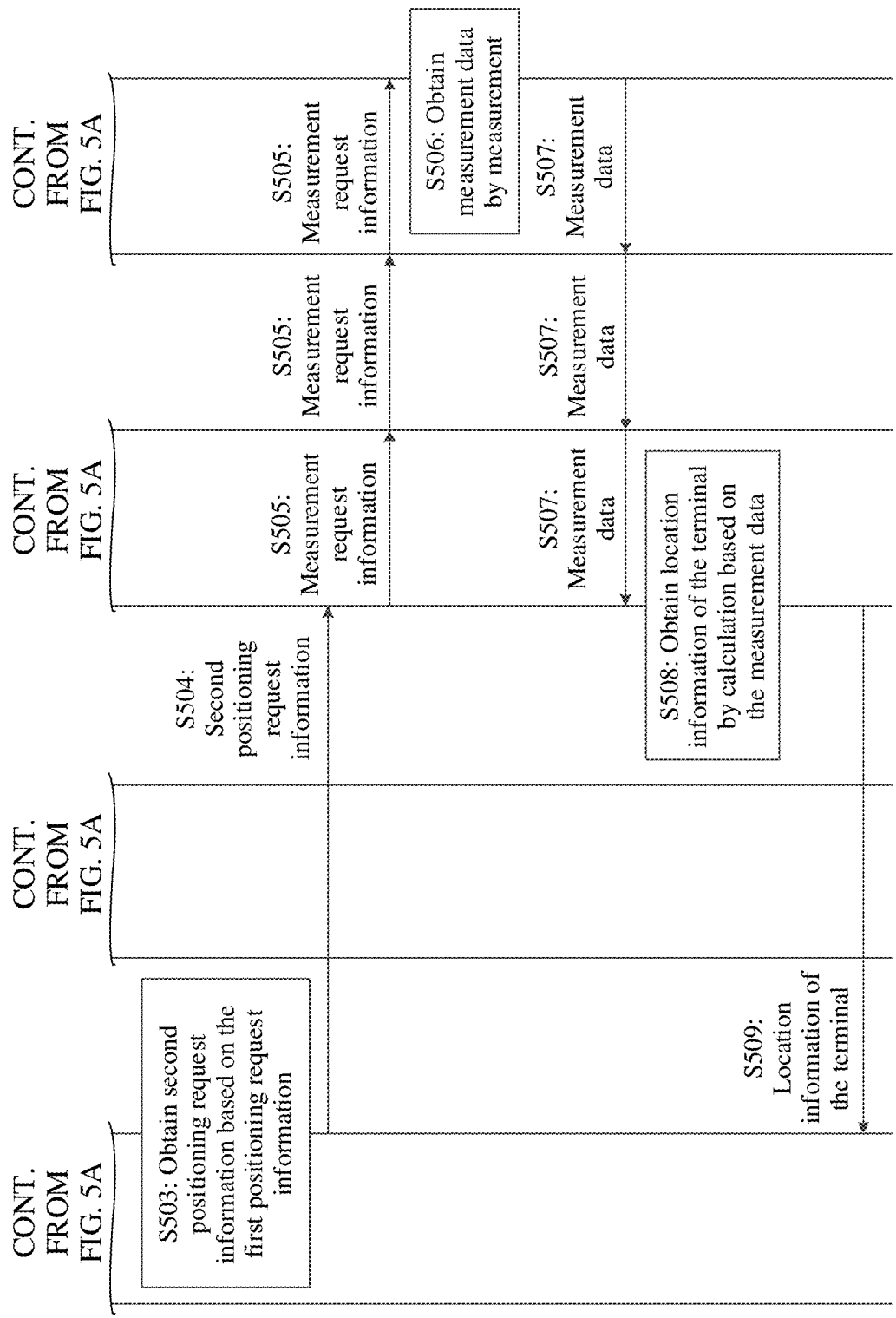

The following describes embodiments shown in FIG. 1 to FIG. 4A and FIG. 4B in detail with reference to an embodiment of FIG. 5A and FIG. 5B.

In some other embodiments, an example in which the wireless communication system shown in FIG. 1 or FIG. 2 is applied to the 5G wireless communication system shown in FIG. 3 is used. FIG. 5A and FIG. 5B are a schematic flowchart of another MEC-based positioning method according to an embodiment of this application. The method includes the following steps.

S501: A positioning requester sends first positioning request information to an AMF network element. Correspondingly, the AMF network element receives the first positioning request information sent by the positioning requester. The first positioning request information is used to request to position a terminal, and the first positioning request information carries identification information of the terminal.

S502: The AMF network element determines, based on the first positioning request information, that a positioning functional entity for positioning the terminal is a positioning server.

S503: The AMF network element obtains second positioning request information based on the first positioning request information. The second positioning request information carries a network address of the terminal.

S504: The AMF network element sends the second positioning request information to the positioning server. Correspondingly, the positioning server may receive the second positioning request information sent by the AMF network element. The second positioning request information is configured to trigger the positioning server to position the terminal via a user plane.

S505: The positioning server sends measurement request information to the terminal via the user plane based on the second positioning request information. Correspondingly, the terminal receives the measurement request information from the positioning server. The measurement request information carries the network address of the terminal, and indicates the terminal to report measurement data. The measurement data is used by the positioning server to obtain location information of the terminal.

Steps S501 to S505 are the same as steps S401 to S405 in the embodiment shown in FIG. 4A and FIG. 4B. For related descriptions, refer to the embodiment shown in FIG. 4A and FIG. 4B. Details are not described herein again.

In this embodiment of this application, in a process of positioning the terminal, the positioning server may interact with the terminal through a user plane transmission path of the terminal. This may avoid forwarding performed via the AMF network element, that is, interaction performed through a control plane transmission path. In this way, a positioning server that is close to the terminal and an access device may be selected by the AMF network element to perform positioning calculation on the terminal, a message transmission distance between the terminal and the positioning server may be shortened, and transmission duration required for data transmission between the terminal and the positioning server may be further reduced, so that a positioning latency of the terminal can be shortened, thereby improving user experience.

It should be noted that, in the embodiment shown in FIG. 5A and FIG. 5B, an example in which a data connection corresponding to the terminal is not established before step S503 is used for description.

Optionally, before the positioning server sends the measurement request information to the terminal through the data connection corresponding to the terminal, because the data connection of the terminal has not been established, before step S503, the AMF further needs to indicate an SMF network element to establish the data connection for the terminal. Further, the AMF network element may obtain the network address of the terminal, where the network address is allocated by a network to the terminal in a data connection establishment process of the terminal. Optionally, in a process that the SMF network element establishes the data connection of the terminal, the SMF network element may allocate the network address to the terminal, and then send the network address to the AMF network element. The SMF network element is a session management network element serving the terminal.

In embodiments of this application, the SMF network element may send the network address of the terminal to the AMF in a plurality of manners. For example, the network address of the terminal may be sent by the SMF network element to the AMF network element after the AMF network element requests the SMF network element, or may be sent by the SMF network element to the AMF network element as the SMF network element is indicated by the AMF network element. This is not specifically limited in embodiments of this application.

On this basis, in some other embodiments, before step S503, the AMF network element may determine whether the data connection corresponding to the terminal has been successfully established. In this case, the embodiment shown in FIG. 5A and FIG. 5B may further include the following steps.

S503a: The AMF network element sends detection information to a UDM network element. Correspondingly, the UDM network element receives the detection information from the AMF network element. The detection information is used to detect whether the data connection corresponding to the terminal exists in the UDM network element.

In some other embodiments, the detection information may include the identification information of the terminal, so that the UDM network element may detect, based on the identification information of the terminal, whether the data connection corresponding to the terminal already exists.

In some other embodiments, the UDM network element may store a record of the data connection corresponding to the terminal. After receiving the detection information, the UDM network element may detect, based on the identification information of the terminal carried in the detection information, whether a record of a PDU session corresponding to the terminal is stored. When detecting that the record of the data connection corresponding to the terminal does not exist in stored records of data connections, the UDM network element may not respond to the detection information or send prompt information to the AMF network element, to notify the AMF network element that the terminal currently has no corresponding data connection. Then, the AMF network element may perform the following step S503b.

S503b: The AMF network element sends network trigger information to the terminal, to trigger the terminal to establish a data connection between the terminal and the positioning server.

The network trigger information includes information about the positioning server, to trigger the terminal to send, to the SMF network element, establishment request information for establishing the data connection between the terminal and the positioning server.

S503c: The terminal sends the establishment request information to the SMF network element based on the network trigger information. The establishment request information carries a data network name (data network name, DNN) of the positioning server.

In some other embodiments, if the information about the positioning server received by the terminal is the DNN of the positioning server, the terminal may send, to the SMF network element, establishment request information that carries the DNN of the positioning server. Alternatively, if the information about the positioning server received by the terminal is an IP address, the terminal may obtain, based on the IP address of the positioning server, the DNN of the positioning server from the UDM network element. Then, the terminal sends, to the SMF network element, establishment request information that carries the DNN of the positioning server. That is, in this embodiment, the DNN of the positioning server received by the SMF network element is sent by the AMF network element via the terminal.

In this embodiment of this application, when the information about the positioning server received by the terminal is an IP address, the terminal may obtain the DNN of the positioning server from the UDM network element based on the IP address of the positioning server, to ensure that the information about the positioning server carried in the establishment request information sent to the SMF network element is the DNN of the positioning service, so that the SMF network element subsequently establishes the data connection between the terminal and the positioning server based on the DNN of the positioning server.

S503d: The SMF network element establishes the data connection between the terminal and the positioning server based on the establishment request information.

In some other embodiments, the SMF network element may obtain the identification information of the terminal. The identification information may be carried in the establishment request information sent by the terminal; the identification information of the terminal may be sent by the AMF network element to the SMF network element; or the like. This is not specifically limited in embodiments of this application.

In some other embodiments, the SMF network element may further obtain first location information such as target TAI information of the terminal. In embodiments of this application, a manner in which the SMF network element obtains the first location information of the terminal is not specifically limited. For example, the SMF may obtain the first location information of the terminal sent by the AMF network element; or the SMF network element may obtain the first location information of the terminal from the UDM network element based on the identification information of the terminal.

In some other embodiments, after receiving the establishment request information, the SMF network element may select, based on the DNN of the positioning server and the first location information such as the target TAI information of the terminal, a UPF network element close to a terminal side, to establish the data connection between the terminal and the positioning server. Optionally, refer to FIG. 3. The data connection may include the terminal, the gNB, the UPF network element, and the positioning server.

In some other embodiments, the SMF network element may allocate the network address to the terminal based on the identification information of the terminal in a process of establishing the data connection between the terminal and the positioning server.

In this embodiment of this application, the SMF network element establishes the data connection between the terminal and the positioning server, so that the terminal and the positioning server may directly exchange data through the data connection without forwarding via the AMF network element. In this way, the transmission distance between the terminal and the positioning server may be shortened, and the transmission duration required for data transmission between the terminal and the positioning server may be further shortened, so that a positioning latency of the terminal can be effectively reduced.

S503e: The SMF network element sends notification information and the network address of the terminal to the AMF network element. The notification information notifies the SMF that the data connection between the terminal and the positioning server has been established.

In some embodiments, after completing establishment of the data connection corresponding to the terminal, the SMF network element may send the notification information to the AMF network element, to notify the AMF network element that establishment of the data connection corresponding to the terminal has been completed.

In this embodiment of this application, the AMF network element may obtain the network address of the terminal via the SMF network element, to enable the positioning server to subsequently interact with the terminal via the user plane based on the network address of the terminal. In this way, a latency in positioning the terminal by the positioning server can be shortened.

In this case, the AMF network element may obtain the second positioning request information based on the network address of the terminal and the first positioning request information. The positioning server may send the measurement request information to the terminal through the data connection corresponding to the terminal.

Optionally, in an implementation scenario of this embodiment of this application, after step S505, the method shown in FIG. 5A and FIG. 5B further includes the following steps S506 to S509.

S506: The terminal obtains the measurement data by measurement.

S507: The terminal sends the measurement data to the positioning server. Correspondingly, the positioning server receives the measurement data from the terminal.

S508: The positioning server obtains second location information of the terminal by calculation based on the measurement data.

S509: The positioning server sends the second location information of the terminal to the positioning requester.

Steps S506 to S509 are the same as steps S406 to S409 in the embodiment shown in FIG. 4A and FIG. 4B. For related descriptions, refer to the embodiment shown in FIG. 4A and FIG. 4B. Details are not described herein again.

In this embodiment of this application, in a process of positioning the terminal, the terminal may interact with the positioning server through the user plane transmission path of the terminal. This may also avoid forwarding performed via the AMF network element, that is, interaction performed through the control plane transmission path. In this way, the transmission distance between the terminal and the positioning server may be shortened, and the transmission duration required for data transmission between the terminal and the positioning server may be further reduced, so that the positioning latency of the terminal can be shortened, thereby improving user experience.

Figure 6A:
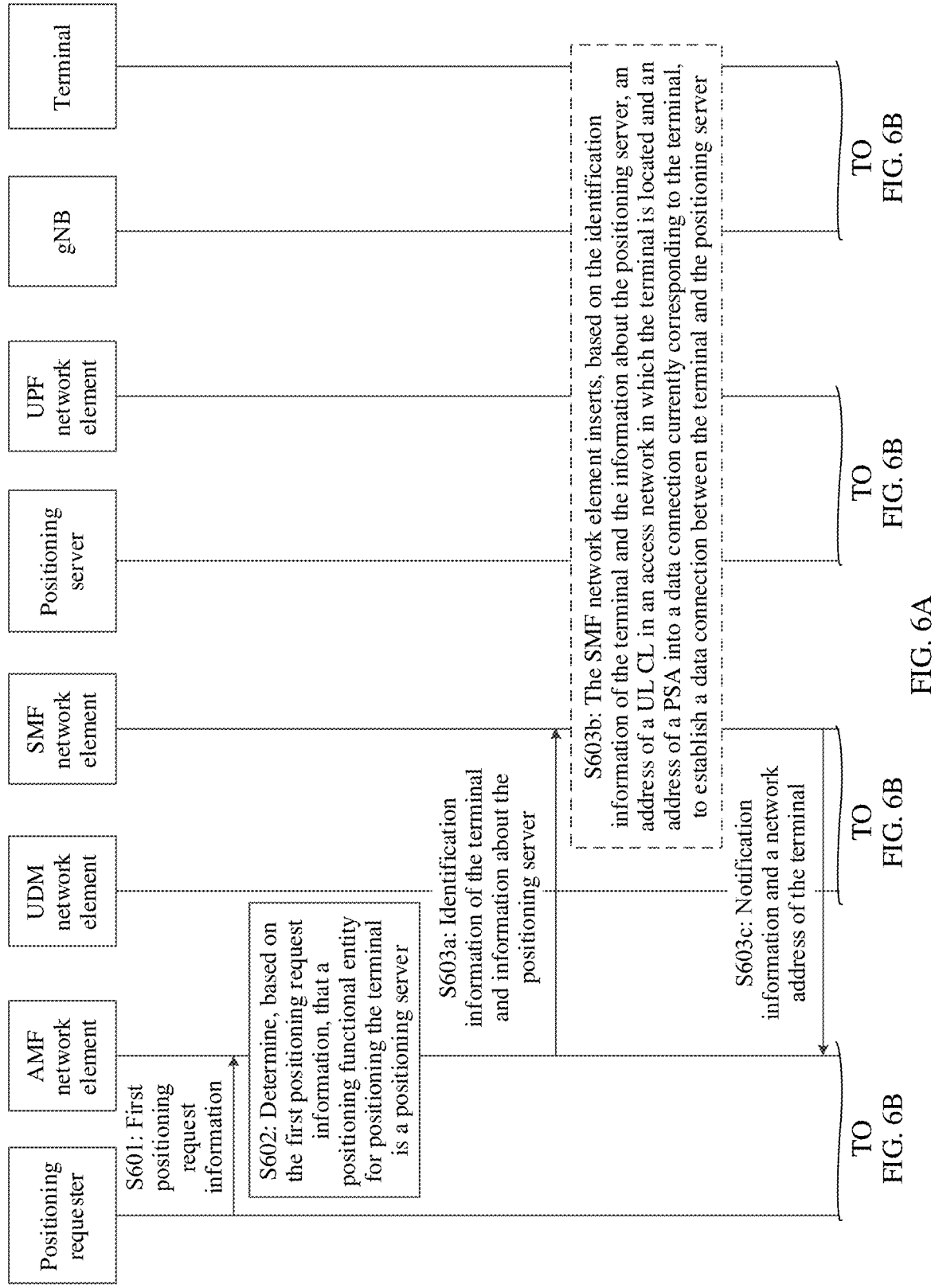
FIG. 6A and FIG. 6B are a schematic flowchart of still another MEC-based positioning method according to an embodiment of this application.
Figure 6B:
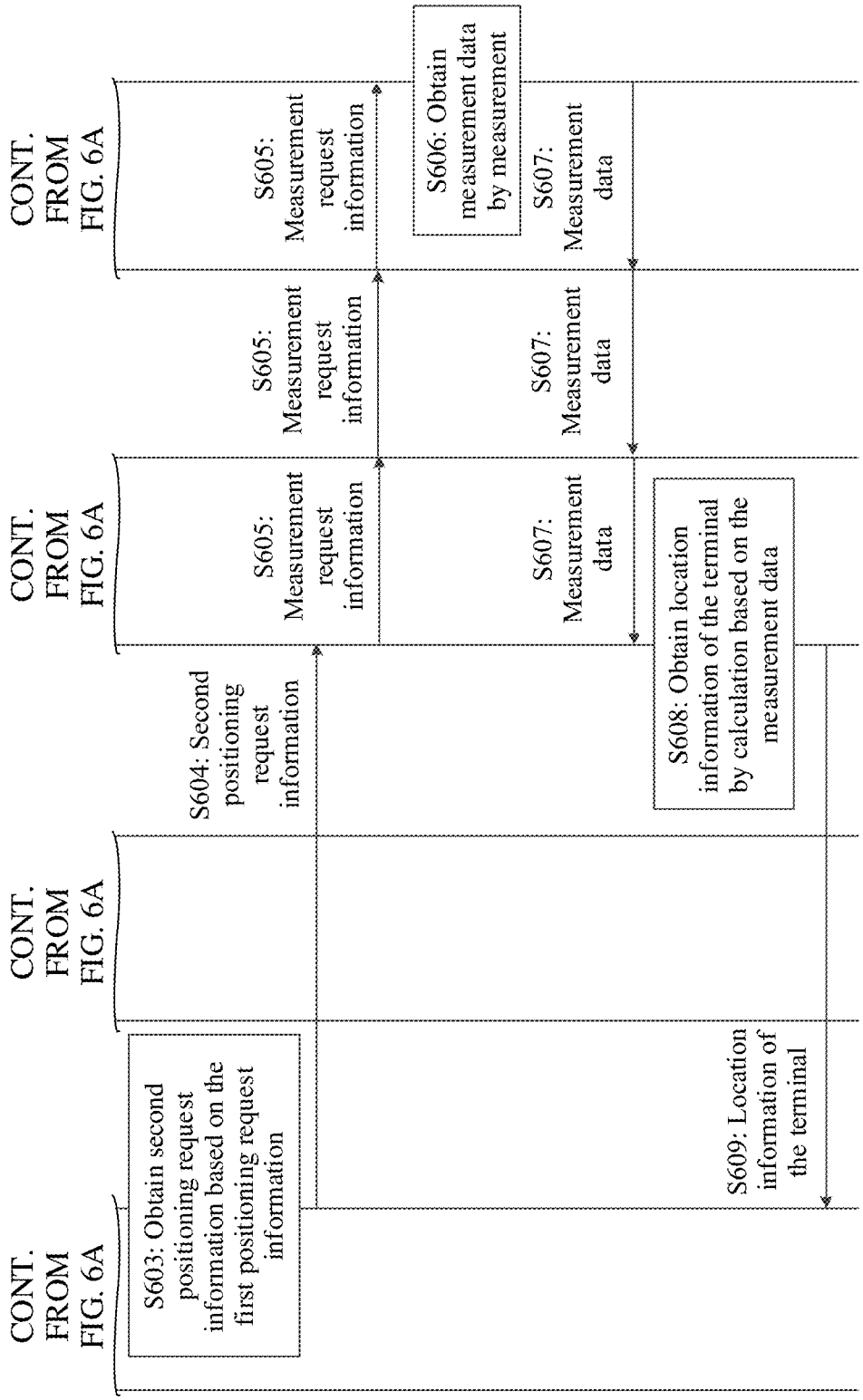
Figure 7:
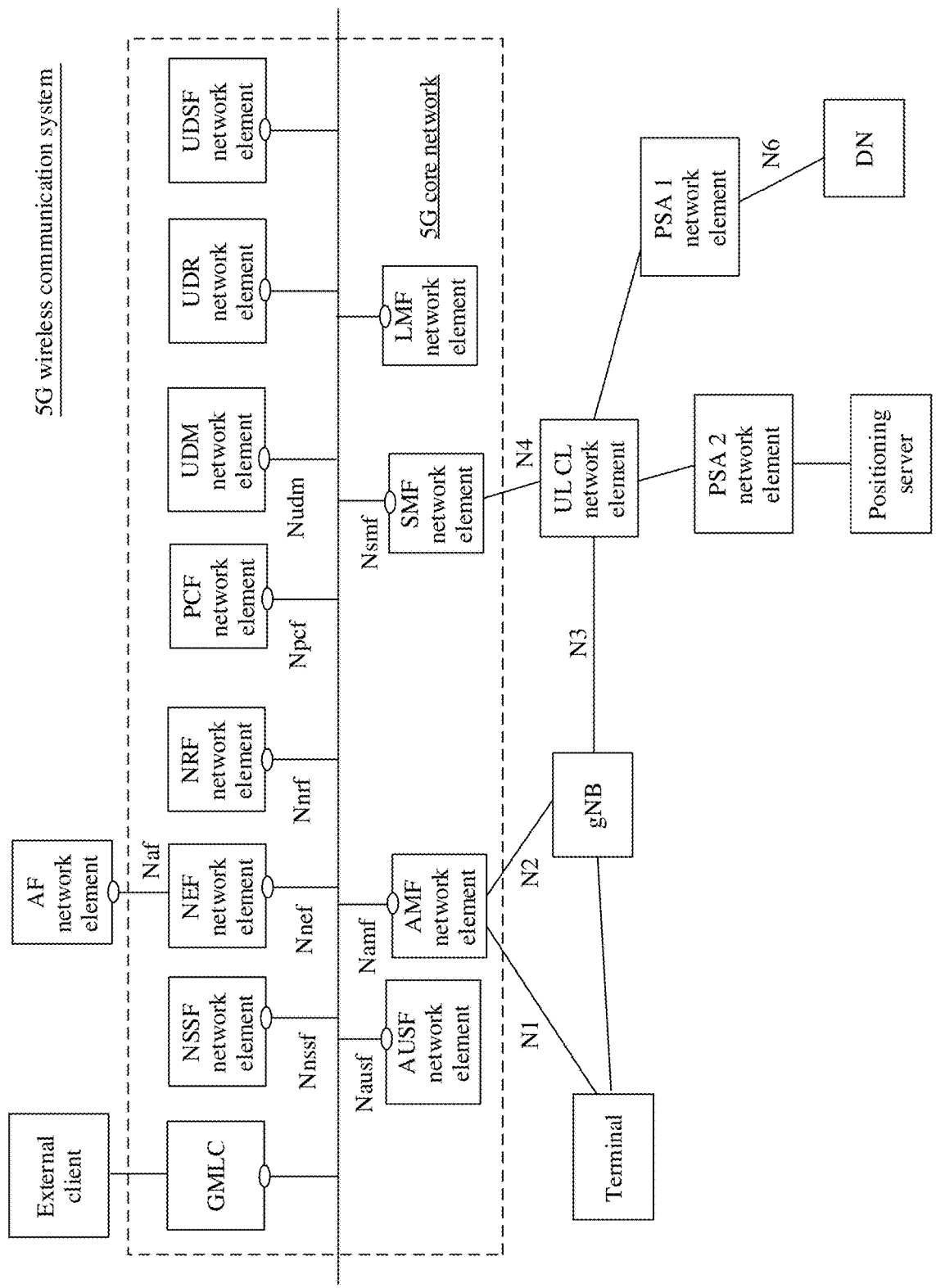
FIG. 7 is a schematic diagram of an architecture of another 5G wireless communication system to which an embodiment of this application is applicable.

The following describes embodiments shown in FIG. 1 to FIG. 5A and FIG. 5B in detail with reference to embodiments of FIG. 6A and FIG. 6B and FIG. 7.

In some other embodiments, an example in which the communication system shown in FIG. 1 or FIG. 2 is applied to the 5G wireless communication system shown in FIG. 3 is used. FIG. 6A and FIG. 6B show still another MEC-based positioning method according to an embodiment of this application. The method includes the following steps.

S601: A positioning requester sends first positioning request information to an AMF network element. Correspondingly, the AMF network element receives the first positioning request information sent by the positioning requester. The first positioning request information is used to request to position a terminal, and the first positioning request information carries identification information of the terminal.

S602: The AMF network element determines, based on the first positioning request information, that a positioning functional entity for positioning the terminal is a positioning server.

S603: The AMF network element obtains second positioning request information based on the first positioning request information. The second positioning request information carries a network address of the terminal.

S604: The AMF network element sends the second positioning request information to the positioning server. Correspondingly, the positioning server may receive the second positioning request information sent by the AMF network element. The second positioning request information is configured to trigger the positioning server to position the terminal via a user plane.

S605: The positioning server sends measurement request information to the terminal via the user plane based on the second positioning request information. Correspondingly, the terminal receives the measurement request information from the positioning server. The measurement request information carries the network address of the terminal, and indicates the terminal to report measurement data. The measurement data is used by the positioning server to obtain location information of the terminal.

Steps S601 to S605 are the same as steps S401 to S405 in the embodiment shown in FIG. 4A and FIG. 4B. For related descriptions, refer to the embodiment shown in FIG. 4A and FIG. 4B. Details are not described herein again.

In this embodiment of this application, in a process of positioning the terminal, the positioning server may interact with the terminal through a user plane transmission path of the terminal. This may avoid forwarding performed via the AMF network element, that is, interaction performed through a control plane transmission path. In this way, a positioning server that is close to the terminal and an access device may be selected by the AMF network element to perform positioning calculation on the terminal, a transmission distance between the terminal and the positioning server may be shortened, and transmission duration required for data transmission between the terminal and the positioning server may be further reduced, so that a positioning latency of the terminal can be shortened, thereby improving user experience.

It should be noted that, in the embodiment shown in FIG. 6A and FIG. 6B, an example in which a data connection corresponding to the terminal has been successfully established before step S603 is used for description.

Optionally, before the positioning server sends the measurement request information to the terminal through the data connection of the terminal, because a destination network address of the measurement request information is the network address of the terminal, the AMF network element obtains the network address of the terminal before step S603, where the network address is allocated by a network to the terminal in a data connection establishment process of the terminal. Optionally, in a process that an SMF network element establishes the data connection of the terminal, the SMF network element allocates the network address to the terminal, and then send the network address to the AMF network element. The SMF network element is a session management network element serving the terminal.

In embodiments of this application, the SMF network element may send the network address of the terminal to the AMF in a plurality of manners. For example, the network address of the terminal may be sent by the SMF network element to the AMF network element after the AMF network element requests the SMF network element, or may be sent by the SMF network element to the AMF network element as the SMF network element is indicated by the AMF network element. This is not specifically limited in embodiments of this application.

On this basis, in some other embodiments, before step S603, the embodiment shown in FIG. 6A and FIG. 6B may further include the following steps.

S603a: The AMF network element sends the identification information of the terminal and information about the positioning server to the SMF network element, to indicate the SMF network element to establish the data connection between the terminal and the positioning server.

In step S603a, the AMF network element has determined that a record of the data connection corresponding to the terminal exists in a UDM network element. FIG. 7 is a schematic diagram of an architecture of another 5G wireless communication system to which an embodiment of this application is applicable. Architectures in FIG. 7 and FIG. 3 are similar, and details are not described herein again. The 5G wireless communication system may support a scenario in which there are a plurality of protocol data unit session anchors (PDU session anchors, PSAs) for one data connection. For example, as shown in FIG. 7, a data connection corresponding to a terminal may include a PSA 1 and a PSA 2. In this step, the data connection that corresponds to the terminal and that currently exists in the UDM network element is a data connection including the terminal, a gNB, the PSA 1, and a data network (data network, DN).

In some other embodiments, when the AMF network element determines that the data connection corresponding to the terminal currently exists in the UDM network element, the AMF network element may send the identification information of the terminal and the information about the positioning server to the SMF network element. Specifically, the information about the positioning server may be an IP address of the positioning server or a DNN of the positioning server. In a specific implementation process, when the information about the positioning server is the IP address of the positioning server, the AMF network element may access a network repository function network element (for example, an NRF network element in FIG. 7) to obtain the DNN of the positioning server. For example, after determining the IP address of the positioning server based on configuration information of the positioning server, the AMF network element sends the IP address of the positioning server to the NRF network element. Then, the NRF network element may determine the DNN of the positioning server based on the received IP address of the positioning server, and send the DNN of the positioning server to the AMF network element. Alternatively, the AMF network element may obtain a prestored relationship between a DNN and an IP address of at least one positioning server. After determining the IP address of the positioning server based on the configuration information of the positioning server, the AMF network element may determine the DNN of the positioning server based on the correspondence. Alternatively, the AMF network element sends the IP address of the positioning server to the SMF network element. Then, the SMF network element converts the IP address of the positioning server into a corresponding DNN, or the like. This is not limited in embodiments of this application.

S603b: The SMF network element inserts, based on the identification information of the terminal and the information about the positioning server, an address of an uplink classifier (Uplink Classifier, UL CL) in an access network in which the terminal is located and an address of a PSA into the data connection currently corresponding to the terminal, to establish the data connection between the terminal and the positioning server.

In some other embodiments, after the SMF network element receives the identification information of the terminal and the information about the positioning server that are sent by the AMF network element, the SMF network element may select to insert the address of the UL CL in the access network in which the terminal is located and the address of the PSA into the data connection currently corresponding to the terminal, to establish the data connection between the terminal and the positioning server. For example, as shown in FIG. 7, an SMF network element may select, based on a DNN of a positioning server and target TAI information of a terminal, a UL CL and a PSA 2 that are close to the terminal and/or a gNB, and establish a data connection from the terminal to the positioning server. In other words, the data connection from the terminal to the positioning server is a data connection including the terminal, the gNB, the PSA 2, and the positioning server. The UL CL may be used for switching a data connection.

In this embodiment of this application, the SMF network element establishes the data connection between the terminal and the positioning server by inserting the address of the UL CL in the access network in which the terminal is located and the address of the PSA into the data connection currently corresponding to the terminal, to select the UL CL and a PSA that are close to a terminal side and the positioning server, so that the terminal and the positioning server may directly exchange data through the newly-established data connection without forwarding via the AMF network element. In this way, the transmission distance between the terminal and the positioning server may be shortened, and the transmission duration required for data transmission between the terminal and the positioning server may be further reduced, so that the positioning latency of the terminal can be effectively shortened.

S603c: The SMF network element sends notification information and the network address of the terminal to the AMF network element. The notification information notifies the SMF that the data connection between the terminal and the positioning server has been established.

In some embodiments, after completing establishment of the data connection corresponding to the terminal, the SMF network element may send the notification information to the AMF network element, to notify the AMF network element that establishment of the data connection corresponding to the terminal has been completed.

In this case, the AMF network element may obtain the second positioning request information based on the network address of the terminal and the first positioning request information. The positioning server may send the measurement request information to the terminal through the data connection between the terminal and the positioning server.

Optionally, in an implementation scenario of this embodiment of this application, after step S605, the method shown in FIG. 6A and FIG. 6B further includes the following steps S606 to S609.

S606: The terminal obtains the measurement data by measurement.

S607: The terminal sends the measurement data to the positioning server. Correspondingly, the positioning server receives the measurement data from the terminal.

S608: The positioning server obtains the location information of the terminal by calculation based on the measurement data.

S609: The positioning server sends second location information of the terminal to the positioning requester.

Steps S606 to S609 are the same as steps S406 to S409 in the embodiment shown in FIG. 4A and FIG. 4B. For related descriptions, refer to the embodiment shown in FIG. 4A and FIG. 4B. Details are not described herein again.

In this embodiment of this application, in a process of positioning the terminal, the terminal may interact with the positioning server through a user plane transmission path of the terminal. This may also avoid forwarding performed via the AMF network element, that is, interaction performed through the control plane transmission path. In this way, the transmission distance between the terminal and the positioning server may be shortened, and the transmission duration required for data transmission between the terminal and the positioning server may be further reduced, so that the positioning latency of the terminal can be shortened, thereby improving user experience.

It should be noted that, in the foregoing embodiment, an example in which the AMF network element determines, based on the first positioning request information, that the positioning functional entity for positioning the terminal is the positioning server is used. Correspondingly, in some other embodiments, the AMF network element may alternatively determine, based on the first positioning request information, that the positioning functional entity for positioning the terminal is an LMF network element. For example, when the AMF network element determines that a positioning latency requirement carried in the first positioning request information is greater than a preset duration threshold, determines that the first positioning request information does not carry first indication information, or determines that the first positioning request information carries second indication information, where the second indication information is used to indicate a high-latency positioning service, the AMF network element determines that fast positioning calculation does not need to be performed on the terminal. In this case, a positioning functional entity such as the LMF network element on a core network side may be selected to position the terminal. A specific procedure in which the LMF network element positions the terminal may be an existing positioning procedure. Details are not described herein again in this embodiment of this application.

In this embodiment of this application, the AMF network element may select, based on different positioning latency requirements of the positioning requester, different positioning functional entities to position the terminal, so that the different positioning latency requirements of the positioning requester may be met.

It should be understood that, in embodiments of this application, each network element and the positioning server may perform some or all of the steps in embodiments of this application. These steps are merely examples. In embodiments of this application, other steps or variations of various steps may be further performed. In addition, the steps may be performed in a sequence different from a sequence presented in embodiments of this application, and not all the steps in embodiments of this application need to be performed.

In embodiments of this application, unless otherwise stated or there is a logic conflict, terms and/or descriptions in different embodiments are consistent and may be mutually referenced, and technical features in different embodiments may be combined based on an internal logical relationship thereof, to form a new embodiment.

The foregoing mainly describes the solutions provided in embodiments of this application from perspectives of interaction between network elements and interaction between the network elements and the positioning server. It should be understood that, to implement the foregoing functions, the first network element, the positioning server, or the terminal includes corresponding hardware structures and/or software modules for performing the functions. A person skilled in the art should easily be aware that, in combination with units and algorithm steps of the examples described in embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, the first network element, the positioning server, or the terminal may be divided into functional modules based on the foregoing method examples. For example, each functional module may be obtained through division based on each corresponding function, or two or more functions may be integrated into one processing module. The integrated module may be implemented in a form of hardware, or may be implemented in a form of a software functional module. It should be noted that, in embodiments of this application, module division is an example, and is merely a logical function division. In actual implementation, another division manner may be used.

Figure 8:
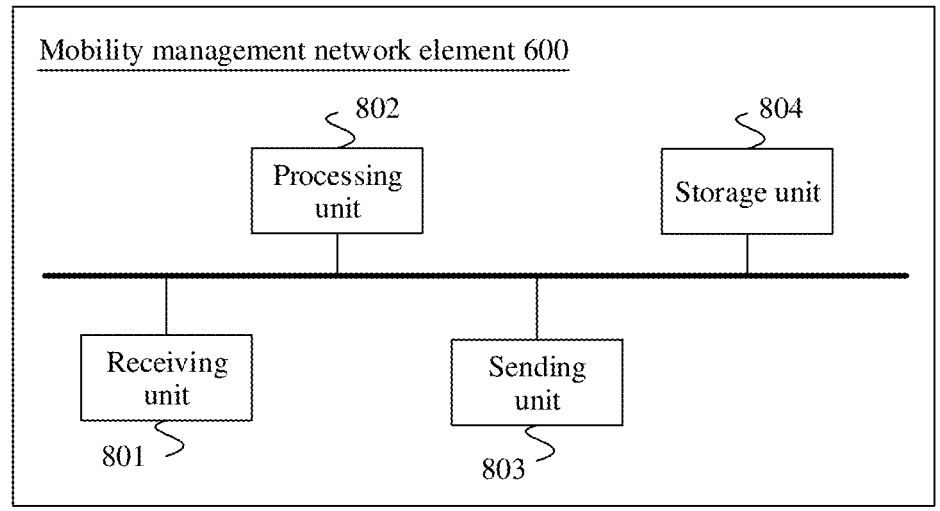
FIG. 8 is a schematic diagram of a structure of a first network element to which an embodiment of this application is applicable.

When an integrated unit (module) is used, FIG. 8 is a schematic diagram of a structure of a first network element to which an embodiment of this application is applicable. As shown in FIG. 8, a first network element 800 may include a receiving unit 801, a processing unit 802, and a sending unit 803.

The processing unit 802 is configured to control and manage an action of the first network element 800. For example, the processing unit 802 is configured to support the first network element 800 in performing the process S402 in FIG. 4A and FIG. 4B to FIG. 6A and FIG. 6B, and/or another process of the technology described in this specification. The sending unit 803 and the receiving unit 801 are configured to support communication between the first network element 800 and another network entity, for example, communication between the first network element 800 and the positioning server and/or the terminal shown in FIG. 4A and FIG. 4B to FIG. 6A and FIG. 6B.

Optionally, the first network element 800 may further include a storage unit 804, configured to store program code and/or data of the first network element 800. For details, refer to the following descriptions.

The receiving unit 801 is configured to receive first positioning request information sent by a positioning requester, where the first positioning request information is used to request to position a terminal, and the first positioning request information carries identification information of the terminal.

The processing unit 802 is configured to: determine, based on the first positioning request information, a positioning functional entity for positioning the terminal, where the positioning functional entity is a positioning server; and obtain second positioning request information based on the first positioning request information.

The sending unit 803 is configured to send the second positioning request information to the positioning server, to trigger the positioning server to position the terminal via a user plane.

In a possible design, the processing unit 802 may be further configured to determine, based on a positioning latency requirement or first indication information carried in the first positioning request information, that the positioning requester has a high requirement for latency.

In a possible design, when determining, based on the first positioning request information, the positioning server for positioning the terminal, the processing unit 802 may be specifically configured to: obtain first location information of the terminal based on the identification information of the terminal, and obtain configuration information of at least one positioning server, where the configuration information of the at least one positioning server includes area information managed by the at least one positioning server; and determine, based on the first location information of the terminal and the configuration information of the at least one positioning server, the positioning server for positioning the terminal.

Specific content of the first location information of the terminal and the area information managed by the at least one positioning server is not limited herein in embodiments of this application. For example, the first location information of the terminal is target tracking area identity TAI information; and the area information managed by the at least one positioning server is tracking area identity TAI information managed by the at least one positioning server.

In a possible design, the receiving unit 801 may be further configured to obtain a network address of the terminal based on the identification information of the terminal. When obtaining the second positioning request information based on the first positioning request information, the processing unit 802 may be specifically configured to obtain the second positioning request information based on the first positioning request information and the network address of the terminal, where the second positioning request information includes the network address of the terminal.

In a possible design, the sending unit 803 may be further configured to send the identification information of the terminal and information about the positioning server to a session management function SMF network element. When obtaining the network address of the terminal based on the identification information of the terminal, the receiving unit 801 may be specifically configured to obtain the network address of the terminal sent by the SMF network element.

In a possible design, the sending unit 803 may be further configured to send information about the positioning server to the terminal, to trigger the terminal to establish a data connection between the terminal and the positioning server. When obtaining the network address of the terminal based on the identification information of the terminal, the receiving unit 801 may be specifically configured to obtain the network address of the terminal sent by an SMF network element, where the network address is allocated by a network to the terminal in a data connection establishment process.

In a possible design, when sending the second positioning request information to the positioning server, the sending unit 803 may be specifically configured to send the second positioning request information to the positioning server via a network exposure function NEF network element.

In a possible design, when determining, based on the positioning latency requirement carried in the first positioning request information, that the positioning requester has a high requirement for latency, the processing unit 802 may be specifically configured to: when determining that the positioning latency requirement is less than or equal to a preset duration threshold, determine that the positioning requester has a high requirement for latency.

In a possible design, when determining, based on the first indication information carried in the first positioning request information, that the positioning requester has a high requirement for latency, the processing unit 802 may be specifically configured to: when the first indication information indicates a low-latency positioning service, determine, based on the first indication information, that the positioning requester has a high requirement for latency.

Specific content of the information about the positioning server is not limited herein in embodiments of this application. For example, the information about the positioning server may be a data network name DNN or an internet protocol IP address corresponding to the positioning server.

The positioning requester is not limited herein in embodiments of this application. For example, the positioning requester may be the terminal or an external client having a positioning requirement.

It should be understood that operations and/or functions of the modules in the first network element 800 are separately used to implement corresponding procedures of the MEC-based positioning methods shown in FIG. 4A and FIG. 4B to FIG. 6A and FIG. 6B. For brevity, details are not described herein again.

Figure 9:
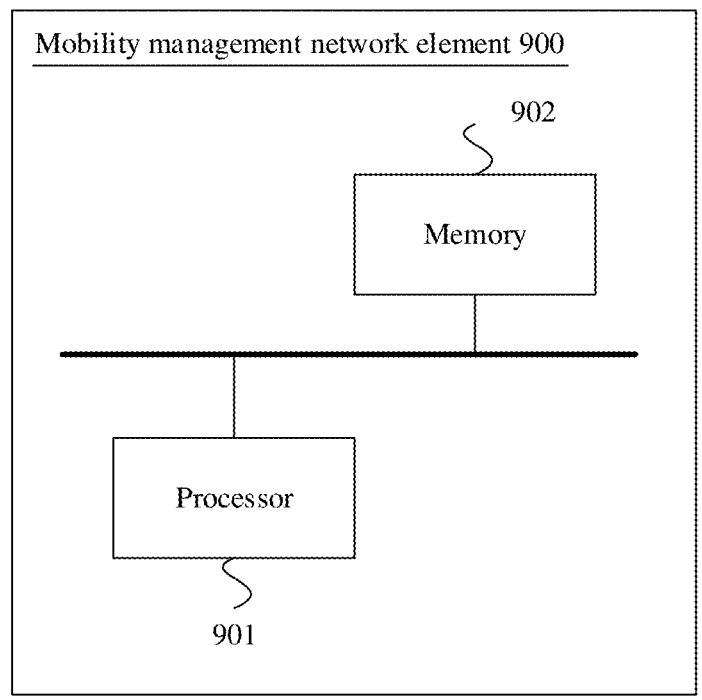
FIG. 9 is a schematic diagram of a structure of another first network element to which an embodiment of this application is applicable.

When an integrated unit (module) is used, FIG. 9 is a schematic diagram of a structure of another first network element to which an embodiment of this application is applicable. As shown in FIG. 9, a first network element 900 may include at least one processor 901 and a memory 902. The memory 902 stores one or more computer programs. For example, the memory 902 stores one or more computer programs necessary for the first network element 900. The processor 901 is configured to support the first network element 900 in implementing the foregoing MEC-based positioning method. For example, when the one or more computer programs stored in the memory 902 are executed by the at least one processor 901, the first network element 900 may implement any one of possible implementations of embodiments of the MEC-based positioning method shown in FIG. 4A and FIG. 4B to FIG. 6A and FIG. 6B, and/or is configured to implement another embodiment described in this specification.

Based on a same concept as the foregoing method embodiments, an embodiment of this application further provides a first network element. The first network element includes modules/units for performing the method embodiments of the foregoing MEC-based positioning method or any one of the possible implementations of the method embodiments. These modules/units may be implemented by hardware, or may be implemented by hardware by executing corresponding software.

Figure 10:
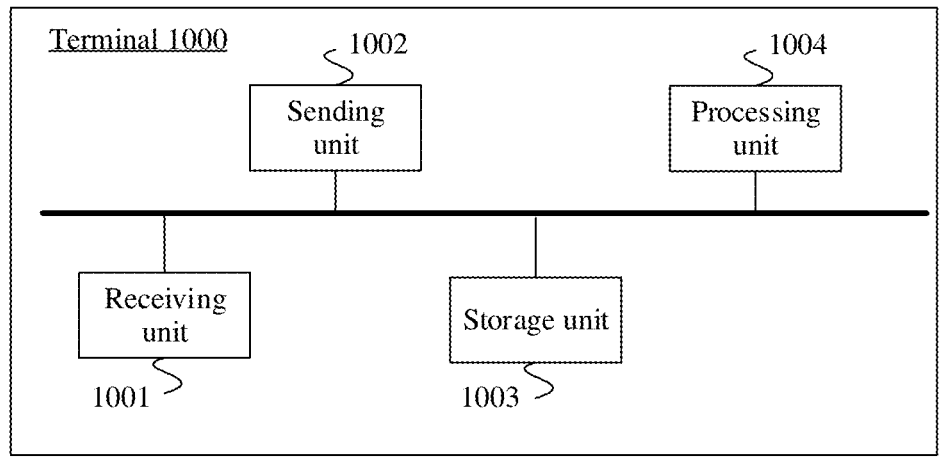
FIG. 10 is a schematic diagram of a structure of a terminal to which an embodiment of this application is applicable.

When an integrated unit (module) is used, FIG. 10 is a schematic diagram of a structure of a terminal to which an embodiment of this application is applicable. As shown in FIG. 10, a terminal 1000 may include a receiving unit 1001 and a sending unit 1002.

The sending unit 1002 and the receiving unit 1001 are configured to support communication between the terminal 1000 and another network entity, for example, communication between the terminal and the first network element and/or the positioning server shown in FIG. 4A and FIG. 4B to FIG. 6A and FIG. 6B.

Optionally, the terminal 1000 further includes a processing unit 1004, configured to control and manage an action of the terminal 1000. For example, the processing unit 1004 is configured to support the terminal 1000 in performing the process S406 in FIG. 4A and FIG. 4B to FIG. 6A and FIG. 6B, and/or another process of the technology described in this specification.

Optionally, the terminal 1000 may further include a storage unit 1003, configured to store program code and/or data of the terminal 1000. For details, refer to the following descriptions.

The receiving unit 1001 is configured to receive measurement request information that is sent by a positioning server through a data connection between the terminal 1000 and the positioning server, where the measurement request information carries a network address of the terminal 1000; and the sending unit 1002 is configured to report measurement data obtained through measurement to the positioning server through the data connection, to enable the positioning server to obtain second location information of the terminal 1000 by calculation based on the measurement data.

In a possible design, before receiving the measurement request information that is sent by the positioning server through the data connection between the terminal 1000 and the positioning server, the receiving unit 1001 may be further configured to receive network trigger information sent by a first network element, where the network trigger information includes information about the positioning server; and the sending unit 1002 may be further configured to send, to an SMF network element based on the network trigger information, establishment request information for establishing the data connection between the terminal 1000 and the positioning server, to establish the data connection.

It should be understood that operations and/or functions of the modules in the terminal 1000 are separately used to implement corresponding procedures of the MEC-based positioning methods shown in FIG. 4A and FIG. 4B to FIG. 6A and FIG. 6B. For brevity, details are not described herein again.

Figure 11:
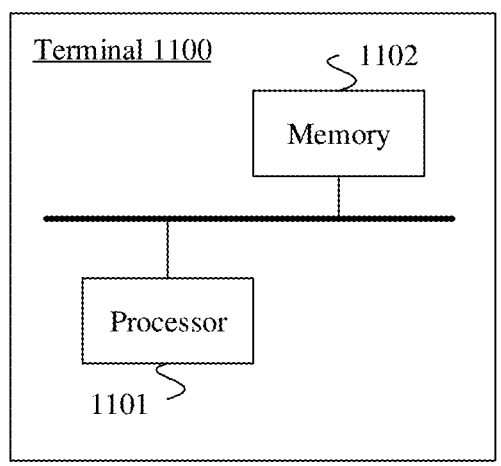
FIG. 11 is a schematic diagram of a structure of another terminal to which an embodiment of this application is applicable.

When an integrated unit (module) is used, FIG. 11 is a schematic diagram of a structure of another terminal to which an embodiment of this application is applicable. As shown in FIG. 11, a terminal 1100 may further include at least one processor 1101 and a memory 1102. The memory 1102 stores one or more computer programs, for example, stores one or more computer programs necessary for the terminal 1100. The processor 1101 is configured to support the terminal 1100 in implementing the foregoing MEC-based positioning method. For example, when the one or more computer programs stored in the memory 1102 are executed by the at least one processor 1101, the terminal 1100 may implement any one of possible implementations of embodiments of the MEC-based positioning method shown in FIG. 4A and FIG. 4B to FIG. 6A and FIG. 6B, and/or is configured to implement another embodiment described in this specification.

Based on a same concept as the foregoing method embodiments, an embodiment of this application further provides a terminal. The terminal includes modules/units for performing the method embodiments of the foregoing MEC-based positioning method or any one of the possible implementations of the method embodiments. These modules/units may be implemented by hardware, or may be implemented by hardware by executing corresponding software.

Figure 12:
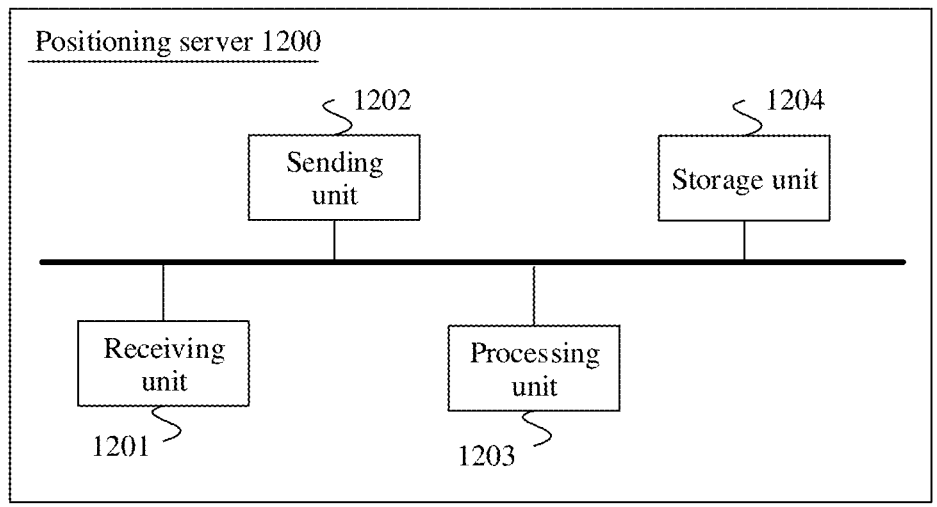
FIG. 12 is a schematic diagram of a structure of a positioning server to which an embodiment of this application is applicable.

When an integrated unit (module) is used, FIG. 12 is a schematic diagram of a structure of a positioning server to which an embodiment of this application is applicable. As shown in FIG. 12, a positioning server 1200 may include a receiving unit 1201, a sending unit 1202, and a processing unit 1203.

In a possible design, the processing unit 1203 is configured to control and manage an action of the positioning server 1200. For example, the processing unit 1203 is configured to support the positioning server 1200 in performing the process S408 in FIG. 4A and FIG. 4B to FIG. 6A and FIG. 6B, and/or another process of the technology described in this specification. The sending unit 1202 and the receiving unit 1201 are configured to support communication between the positioning server 1200 and another network entity, for example, communication between the positioning server 1200 and the first network element and/or the terminal shown in FIG. 4A and FIG. 4B to FIG. 6A and FIG. 6B.

Optionally, the positioning server 1200 may further include a storage unit 1204, configured to store program code and/or data of the positioning server 1200. For details, refer to the following descriptions.

The receiving unit 1201 is configured to receive second positioning request information sent by a first network element, where the second positioning request information carries a network address of a terminal.

The sending unit 1202 is configured to send measurement request information to the terminal through a data connection between the terminal and the positioning server 1200 and based on the network address of the terminal that is carried in the second positioning request information, where the measurement request information is used to request the terminal to report measurement data.

The receiving unit 1201 is further configured to receive the measurement data reported by the terminal through the data connection.

The processing unit 1203 is configured to obtain second location information of the terminal by calculation based on the measurement data.

In a possible design, when sending the measurement request information to the terminal through the data connection between the terminal and the positioning server 1200 and based on the network address of the terminal that is carried in the second positioning request information, the sending unit 1202 may be specifically configured to send the network address of the terminal and the measurement request information to a user plane function UPF network element, to enable the UPF to forward the measurement request information to the terminal based on the network address of the terminal through the data connection.

In a possible design, the sending unit 1202 may be further configured to: if a positioning requester is the terminal, feed back the second location information to the terminal via a network exposure function NEF network element; or if a positioning requester is an external client having a positioning requirement, feed back the second location information to the external client via a service capability exposure function GMLC network element.

It should be understood that operations and/or functions of the modules in the positioning server 1200 are separately used to implement corresponding procedures of the MEC-based positioning methods shown in FIG. 4A and FIG. 4B to FIG. 6A and FIG. 6B. For brevity, details are not described herein again.

Figure 13:
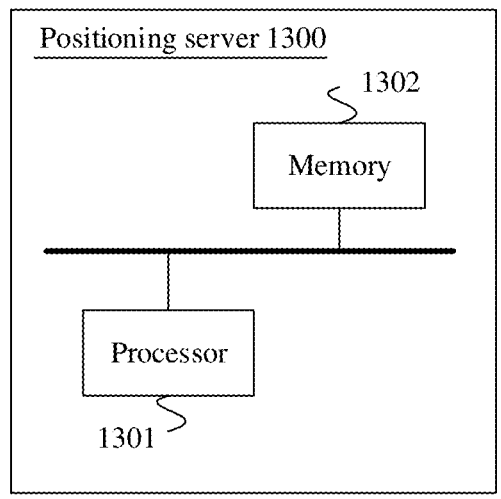
FIG. 13 is a schematic diagram of a structure of another positioning server to which an embodiment of this application is applicable.

When an integrated unit (module) is used, FIG. 13 is a schematic diagram of a structure of another positioning server to which an embodiment of this application is applicable. As shown in FIG. 13, a positioning server 1300 may include at least one processor 1301 and a memory 1302. The memory 1302 stores one or more computer programs. For example, the memory is configured to store one or more computer programs necessary for the positioning server 1300. The processor 1301 is configured to support the positioning server 1300 in implementing the foregoing MEC-based positioning method. For example, when the one or more computer programs stored in the memory 1302 are executed by the at least one processor 1301, the positioning server 1300 may implement any one of possible implementations of embodiments of the MEC-based positioning method shown in FIG. 4A and FIG. 4B to FIG. 6A and FIG. 6B, and/or is configured to implement another embodiment described in this specification.

Based on a same concept as the foregoing method embodiments, an embodiment of this application further provides a positioning server. The positioning server includes modules/units for performing the method embodiments of the foregoing MEC-based positioning method or any one of the possible implementations of the method embodiments. These modules/units may be implemented by hardware, or may be implemented by hardware by executing corresponding software.

Based on a same concept as the foregoing method embodiments, an embodiment of this application further provides a computer-readable storage medium. The computer-readable storage medium stores a computer program. When the computer program is run on a computer, the computer is enabled to perform the method embodiments of the foregoing MEC-based positioning method and any one of the possible implementations of the method embodiments, for example, perform any step of embodiments of the MEC-based positioning method shown in FIG. 4A and FIG. 4B to FIG. 6A and FIG. 6B, and/or perform another process of the technology described in this specification.

Based on a same concept as the foregoing method embodiments, an embodiment of this application further provides a program product. When the program product is run on a computer, the computer is enabled to perform the method embodiments of the foregoing MEC-based positioning method and any one of the possible implementations of the method embodiments, for example, perform any step of embodiments of the MEC-based positioning method shown in FIG. 4A and FIG. 4B to FIG. 6A and FIG. 6B, and/or perform another process of the technology described in this specification.

Based on a same concept as the foregoing method embodiments, an embodiment of this application further provides a chip. The chip may be coupled with a memory of a first network element, a terminal, or a positioning server, where the chip is configured to: invoke a computer program stored in the memory; and perform the method embodiments of the foregoing MEC-based positioning method and any one of the possible implementations of the method embodiments, for example, perform any step of embodiments of the MEC-based positioning method shown in FIG. 4A and FIG. 4B to FIG. 6A and FIG. 6B, and/or perform another process of the technology described in this specification.

It should be understood that a processor or a processing unit (for example, the processor or the processing unit shown in FIG. 8 to FIG. 13) in embodiments of this application may be an integrated circuit chip and has a signal processing capability. In an implementation process, steps in the method embodiments of the MEC-based positioning method may be completed by using an integrated logic circuit of hardware in the processor, or by using instructions in a form of software. The processor may be a general-purpose central processing unit (central processing unit, CPU), a general-purpose processor, digital signal processor (digital signal processor, DSP), an application-specific integrated circuit (application-specific integrated circuits, ASIC), a field programmable gate array (field programmable gate array, FPGA) or another programmable logic device, a transistor logic device, a hardware component, or any combination thereof; or may be a combination implementing a computing function, for example, a combination of one or more microprocessors or a combination of a DSP and a microprocessor. The general-purpose processor may be a microprocessor, or the processor may be any conventional processor or the like.

It should be understood that a memory or a storage unit in embodiments of this application may be a volatile memory or a nonvolatile memory, or may include both a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), used as an external cache. Through example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus dynamic random access memory (direct rambus RAM, DR RAM). It should be noted that the memory in the system and method described in this application is intended to include but is not limited to these memories and any other memories of a proper type.

Various illustrative logic units and circuits described in embodiments of this application may implement or operate the described functions by using a general-purpose processor, a digital signal processor, an application-specific integrated circuit (application-specific integrated circuit, ASIC), a field programmable gate array (field programmable gate array, FPGA) or another programmable logic apparatus, a discrete gate or transistor logic, a discrete hardware component, or any combination thereof. The general-purpose processor may be a microprocessor. Optionally, the general-purpose processor may also be any conventional processor, controller, microcontroller, or state machine. The processor may also be implemented by a combination of computing apparatuses, such as a digital signal processor and a microprocessor, a plurality of microprocessors, one or more microprocessors with a digital signal processor core, or any other similar configuration.

Steps of the methods or algorithms described in embodiments of this application may be directly embedded into hardware, a software unit executed by a processor, or a combination thereof. The software unit may be stored in a RAM, a flash memory, a ROM, an EPROM, an EEPROM, a register, a hard disk, a removable disk, a CD-ROM, or any other storage medium in the art. For example, the storage medium may connect to a processor, so that the processor may read information from the storage medium and write information to the storage medium. Optionally, the storage medium may be integrated into a processor. The processor and the storage medium may be disposed in an ASIC. The ASIC may be disposed in a communication device (such as a terminal, a positioning server, or a first network element), for example, may be disposed in different components in the communication device.

All or some of the foregoing embodiments may be implemented by using software, hardware, firmware, or any combination thereof. When software is used to implement embodiments, all or a part of embodiments may be implemented in a form of a computer program product. The computer program product includes one or more computer programs or instructions. When the computer programs or the instructions are loaded and executed on a computer, the procedures or the functions according to embodiments of this application are all or partially implemented. The computer may be a general-purpose computer, a dedicated computer, a computer network, or other programmable apparatuses. The computer programs or the instructions may be stored in a computer-readable storage medium, or may be transmitted through the computer-readable storage medium. The computer-readable storage medium may be any usable medium accessible by a computer, or a data storage device such as a server integrating one or more usable media. The usable medium may be a magnetic medium, for example, a floppy disk, a hard disk, or a magnetic tape; or may be an optical medium, for example, a DVD; or may be a semiconductor medium, for example, a solid-state drive (solid-state drive, SSD).

Embodiments of this application are described with reference to the flowcharts and/or block diagrams of the methods, the apparatuses, and the computer program product according to embodiments. It should be understood that computer program instructions may be used to implement each procedure and/or each block in the flowcharts and/or the block diagrams and a combination of a procedure and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or the processor of the another programmable data processing device generate an apparatus for implementing a specific function in one or more procedures in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more procedures in the flowcharts and/or in one or more blocks in the block diagrams.

The computer program instructions may alternatively be loaded onto a computer or another programmable data processing device, so that a series of operations and steps are performed on the computer or the another programmable device, so that computer-implemented processing is generated. Therefore, the instructions executed on the computer or the another programmable device provide steps for implementing a specific function in one or more procedures in the flowcharts and/or in one or more blocks in the block diagrams.

Although embodiments of this application are described with reference to specific features, it is clear that various modifications and combinations may be made to them without departing from the spirit and scope of embodiments of this application. Correspondingly, the specification and the accompanying drawings are merely example descriptions of embodiments of this application that are defined by the appended claims, and are considered to cover any or all of modifications, variations, combinations, or equivalents in the scope of embodiments of this application.

What is claimed is:

1. A mobile edge computing positioning method, comprising:
   receiving, by a first network element, first positioning request information which requests to position a terminal, and carries identification information of the terminal;
   determining, by the first network element based on the first positioning request information, a positioning server for positioning the terminal;
   obtaining, by the first network element, second positioning request information based on the first positioning request information, wherein the obtaining the second positioning request information comprises:
      obtaining, by the first network element based on the identification information of the terminal, a network address of the terminal; and
      obtaining, by the first network element, the second positioning request information based on the first positioning request information and the network address of the terminal, wherein the second positioning request information comprises the network address of the terminal; and
   sending, by the first network element, the second positioning request information to the positioning server, to trigger the positioning server to position the terminal via a user plane.

2. The method according to claim 1, wherein the method further comprises:
   determining, by the first network element based on a positioning latency requirement or first indication information carried in the first positioning request information, that a positioning requester which sent the first positioning request information has a high requirement for latency.

3. The method according to claim 1, wherein the determining the positioning server comprises:
   obtaining, by the first network element,
      first location information of the terminal based on the identification information of the terminal, and
      configuration information of at least one positioning server, wherein the configuration information of the at least one positioning server comprises area information managed by the at least one positioning server; and
   determining, by the first network element based on the first location information of the terminal and the configuration information of the at least one positioning server, the positioning server for positioning the terminal.

4. The method according to claim 3, wherein
the first location information of the terminal is target tracking area identity (TAI) information; and
the area information managed by the at least one positioning server is TAI information managed by the at least one positioning server.

5. The method according to claim 1, wherein the obtaining the network address of the terminal comprises:
sending, by the first network element, the identification information of the terminal and information about the positioning server to a session management function (SMF) network element; and
obtaining, by the first network element, the network address of the terminal sent by the SMF network element.

6. The method according to claim 1, wherein the obtaining the network address of the terminal comprises:
sending, by the first network element, information about the positioning server to the terminal, to trigger the terminal to establish a data connection between the terminal and the positioning server; and
obtaining, by the first network element, the network address of the terminal sent by a session management function (SMF) network element, wherein the network address is allocated by a network to the terminal in a data connection establishment process.

7. The method according to claim 1, wherein the sending the second positioning request information comprises:
sending, by the first network element, the second positioning request information to the positioning server via a network exposure function (NEF) network element.

8. The method of claim 1, wherein the method further comprises:
receiving, by the terminal, measurement request information that is sent by the positioning server through a data connection between the terminal and the positioning server, wherein the measurement request information carries the network address of the terminal; and
reporting, by the terminal, measurement data obtained through measurement to the positioning server through the data connection, to enable the positioning server to calculate second location information of the terminal based on the measurement data.

9. The method according to claim 8, wherein before the receiving the measurement request information, the method further comprises:
receiving, by the terminal, network trigger information sent by the first network element, wherein the network trigger information comprises information about the positioning server; and
sending, by the terminal to a session management function (SMF) network element based on the network trigger information, establishment request information for establishing the data connection between the terminal and the positioning server, to establish the data connection.

10. The method according to claim 1, further comprising:
receiving, by the positioning server, the second positioning request information sent by the first network element, wherein the second positioning request information carries the network address of the terminal;
sending, by the positioning server, measurement request information to the terminal through a data connection between the terminal and the positioning server and based on the network address of the terminal that is carried in the second positioning request information, wherein the measurement request information requests the terminal to report measurement data;
receiving, by the positioning server, the measurement data reported by the terminal through the data connection; and
obtaining, by the positioning server, second location information of the terminal by calculation based on the measurement data.

11. The method according to claim 10, wherein the sending the measurement request information comprises:
sending, by the positioning server, the network address of the terminal and the measurement request information to a user plane function (UPF) network element, to enable the UPF network element to forward, through the data connection, the measurement request information to the terminal based on the network address of the terminal.

12. The method according to claim 10, wherein the method further comprises:
if a positioning requester is the terminal, feeding back, by the positioning server, the second location information to the terminal via a network exposure function (NEF) network element; or
if a positioning requester is an external client having a positioning requirement, feeding back, by the positioning server, the second location information to the external client via a gateway mobile location center (GMLC) network element.

13. A network element, comprising at least one processor and a memory, wherein
the memory stores one or more computer programs; and
when the one or more computer programs stored in the memory are executed by the at least one processor, the network element is enabled to:
receive first positioning request information which requests to position a terminal, and carries identification information of the terminal;
determine, based on the first positioning request information, a positioning server for positioning the terminal;
obtain, based on the identification information of the terminal, a network address of the terminal;
obtain second positioning request information based on the first positioning request information and the network address of the terminal, wherein the second positioning request information comprises the network address of the terminal; and
send the second positioning request information to the positioning server, to trigger the positioning server to position the terminal via a user plane.

14. The network element according claim 13, wherein when the one or more computer programs stored in the memory are executed by the at least one processor, the network element is further enabled to:
determine, based on a positioning latency requirement or first indication information carried in the first positioning request information, that a positioning requester which sent the first positioning request information has a high requirement for latency.

15. The network element according claim 13, wherein when the one or more computer programs stored in the memory are executed by the at least one processor, the network element is further enabled to:
obtain first location information of the terminal based on the identification information of the terminal;
obtain configuration information of at least one positioning server, wherein the configuration information of the at least one positioning server comprises area information managed by the at least one positioning server; and
determine, based on the first location information of the terminal and the configuration information of the at least one positioning server, the positioning server for positioning the terminal.

16. The network element according claim 15, wherein
the first location information of the terminal is target tracking area identity (TAI) information; and
the area information managed by the at least one positioning server is TAI information managed by the at least one positioning server.

17. The network element according claim 13, wherein when the one or more computer programs stored in the memory are executed by the at least one processor, the network element is further enabled to:
send the identification information of the terminal and information about the positioning server to a session management function (SMF) network element; and
obtain the network address of the terminal sent by the SMF network element.

18. The network element according claim 13, wherein when the one or more computer programs stored in the memory are executed by the at least one processor, the network element is further enabled to:
send information about the positioning server to the terminal, to trigger the terminal to establish a data connection between the terminal and the positioning server; and
obtain the network address of the terminal sent by a session management function (SMF) network element, wherein the network address is allocated by a network to the terminal in a data connection establishment process.

19. A system, comprising: a network element and a terminal,
the network element comprising at least one processor and a memory, wherein the memory stores one or more computer programs, and when the one or more computer programs stored in the memory are executed by the at least one processor, the network element is enabled to:
receive first positioning request information which requests to position the terminal, and carries identification information of the terminal;
determine, based on the first positioning request information, a positioning server for positioning the terminal;
obtain second positioning request information based on the first positioning request information; and
send the second positioning request information to the positioning server, to trigger the positioning server to position the terminal via a user plane; and
the terminal comprising at least one further processor and a further memory, wherein the further memory stores one or more further computer programs, and when the one or more further computer programs stored in the further memory are executed by the at least one further processor, the terminal is enabled to:
receive network trigger information sent by the network element, wherein the network trigger information comprises information about the positioning server;
send to a session management function (SMF) network element, based on the network trigger information, establishment request information for establishing a data connection between the terminal and the positioning server, to establish the data connection;
receive measurement request information that is sent by the positioning server through the data connection between the terminal and the positioning server, wherein the measurement request information carries a network address of the terminal; and
report measurement data obtained through measurement to the positioning server through the data connection, to enable the positioning server to calculate second location information of the terminal based on the measurement data.

20. A mobile edge computing positioning method, comprising:
receiving, by a first network element, first positioning request information which requests to position a terminal, and carries identification information of the terminal;
determining, by the first network element based on the first positioning request information, a positioning server for positioning the terminal;
obtaining, by the first network element, second positioning request information based on the first positioning request information;
sending, by the first network element, the second positioning request information to the positioning server, to trigger the positioning server to position the terminal via a user plane;
receiving, by the terminal, network trigger information sent by the first network element, wherein the network trigger information comprises information about the positioning server;
sending, by the terminal to a session management function (SMF) network element based on the network trigger information, establishment request information for establishing a data connection between the terminal and the positioning server, to establish the data connection;
receiving, by the terminal, measurement request information that is sent by the positioning server through the data connection between the terminal and the positioning server, wherein the measurement request information carries a network address of the terminal; and
reporting, by the terminal, measurement data obtained through measurement to the positioning server through the data connection, to enable the positioning server to calculate second location information of the terminal based on the measurement data.

* * * * *